United States Patent
Wainer et al.

(10) Patent No.: US 12,114,606 B2
(45) Date of Patent: Oct. 15, 2024

(54) AUTOMATED HEMP FLOWER HARVESTER MACHINERY AND APPARATUSES, METHODS RELATING TO SAME

(71) Applicant: ROCKY FORD HARVESTING, LLC, Rocky Ford, CO (US)

(72) Inventors: Ryan Wainer, Rocky Ford, CO (US); Joel Lundquist, Rocky Ford, CO (US)

(73) Assignee: Rocky Ford Harvesting, LLC, Rocky Ford, CO (US)

( * ) Notice: Subject to any disclaimer, the term of this patent is extended or adjusted under 35 U.S.C. 154(b) by 700 days.

(21) Appl. No.: 16/889,568

(22) Filed: Jun. 1, 2020

(65) Prior Publication Data
US 2020/0375110 A1    Dec. 3, 2020

Related U.S. Application Data

(60) Provisional application No. 62/855,595, filed on May 31, 2019.

(51) Int. Cl.
*A01D 45/06* (2006.01)

(52) U.S. Cl.
CPC .................................. *A01D 45/065* (2013.01)

(58) Field of Classification Search
CPC ...... A01D 45/06; A01D 45/065; A01D 41/12; A01D 41/1217; A01D 41/1226; A01D 41/1208; A01D 43/07; A01D 43/073; A01D 43/087; A01F 12/46; A01F 12/32; A01F 12/34; A01F 12/36; A01F 12/44; A01F 12/446; A01F 12/60; B65G 33/00–33/38
See application file for complete search history.

(56) References Cited

U.S. PATENT DOCUMENTS

| | | | | |
|---|---|---|---|---|
| 126,670 A | * | 5/1872 | Breese | A01F 12/446 460/91 |
| 648,588 A | * | 5/1900 | Jensen | B07B 1/4636 209/398 |
| 3,220,539 A | * | 11/1965 | Anagnos | B65G 33/00 198/662 |
| 3,477,599 A | * | 11/1969 | Coene | A01D 41/1217 414/502 |
| 3,800,803 A | * | 4/1974 | Rouse | A01F 12/446 209/398 |
| 3,825,138 A | * | 7/1974 | Pool | A01D 41/1217 198/674 |

(Continued)

*Primary Examiner* — Adam J Behrens
*Assistant Examiner* — Madeline I Runco
(74) *Attorney, Agent, or Firm* — COOLEY LLP

(57) ABSTRACT

A system includes an open sieve and an auger tip. The open sieve includes an outer frame and a set of crossbars, the outer frame and the set of crossbars defining a plurality of openings. The auger tip includes a tubular portion and a flange. The tubular portion has a first end, a second end, and defines an interior cavity. The flange is coupled to the first end. The flange is configured to be coupled to an auger housing such that a shaft coupled to an auger within the auger housing can be disposed within the interior cavity of the tubular portion and within a bearing rotatably mounted to the second end of the auger tip. The tubular portion defines an opening in a sidewall of the tubular portion such that flower material that has been conveyed to the interior cavity by the auger can fall through the opening.

19 Claims, 40 Drawing Sheets

(56) References Cited

U.S. PATENT DOCUMENTS

| | | | | |
|---|---|---|---|---|
| 3,963,112 | A | * | 6/1976 | Crego .................... A01F 12/46 198/671 |
| 4,008,819 | A | * | 2/1977 | Hanaway ........... A01D 41/1226 414/505 |
| 2002/0147038 | A1 | * | 10/2002 | McLeod ................ A01D 41/04 460/12 |
| 2014/0073380 | A1 | * | 3/2014 | Ricketts ................ A01F 12/444 460/101 |
| 2016/0096686 | A1 | * | 4/2016 | Koenig ................. B65G 33/32 198/672 |
| 2019/0183046 | A1 | * | 6/2019 | Ueda ................. A01D 41/1208 |

* cited by examiner

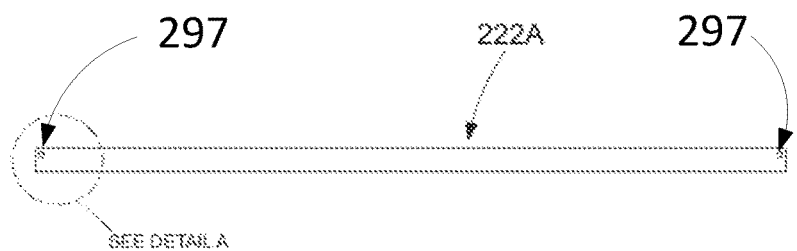
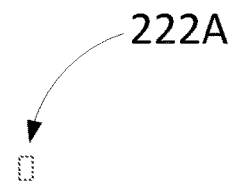
FIG. 2G　　　　　　　　FIG. 2H
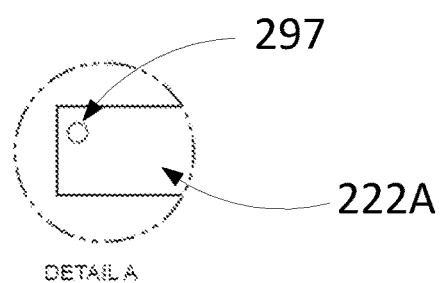
FIG. 2I
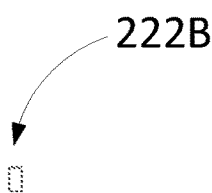
FIG. 2J　　　　　　　　FIG. 2K
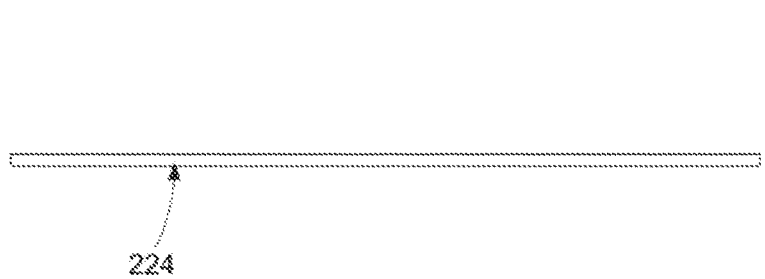
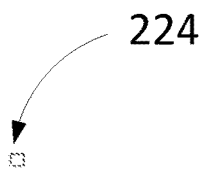
FIG. 2L　　　　　　　　FIG. 2M

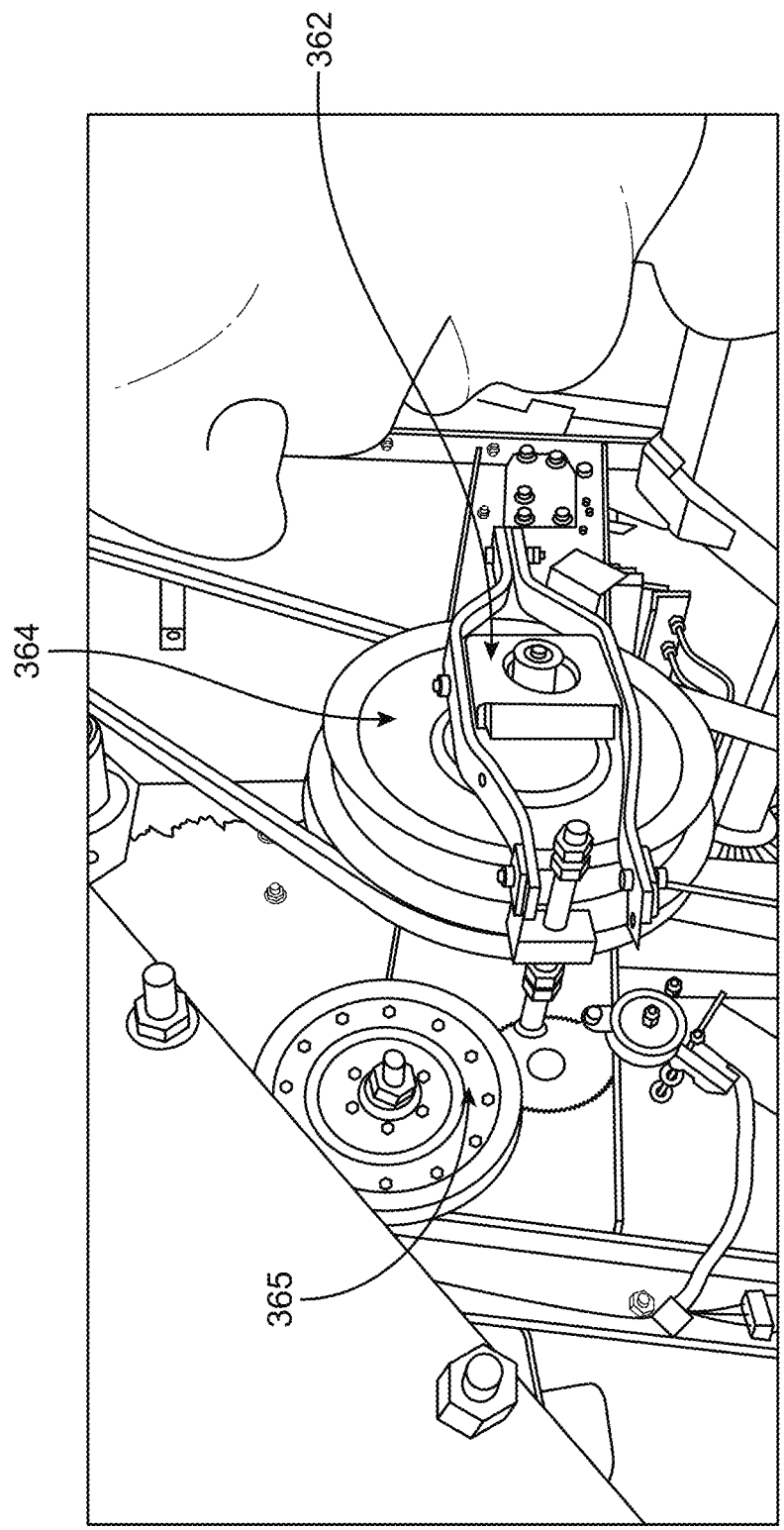

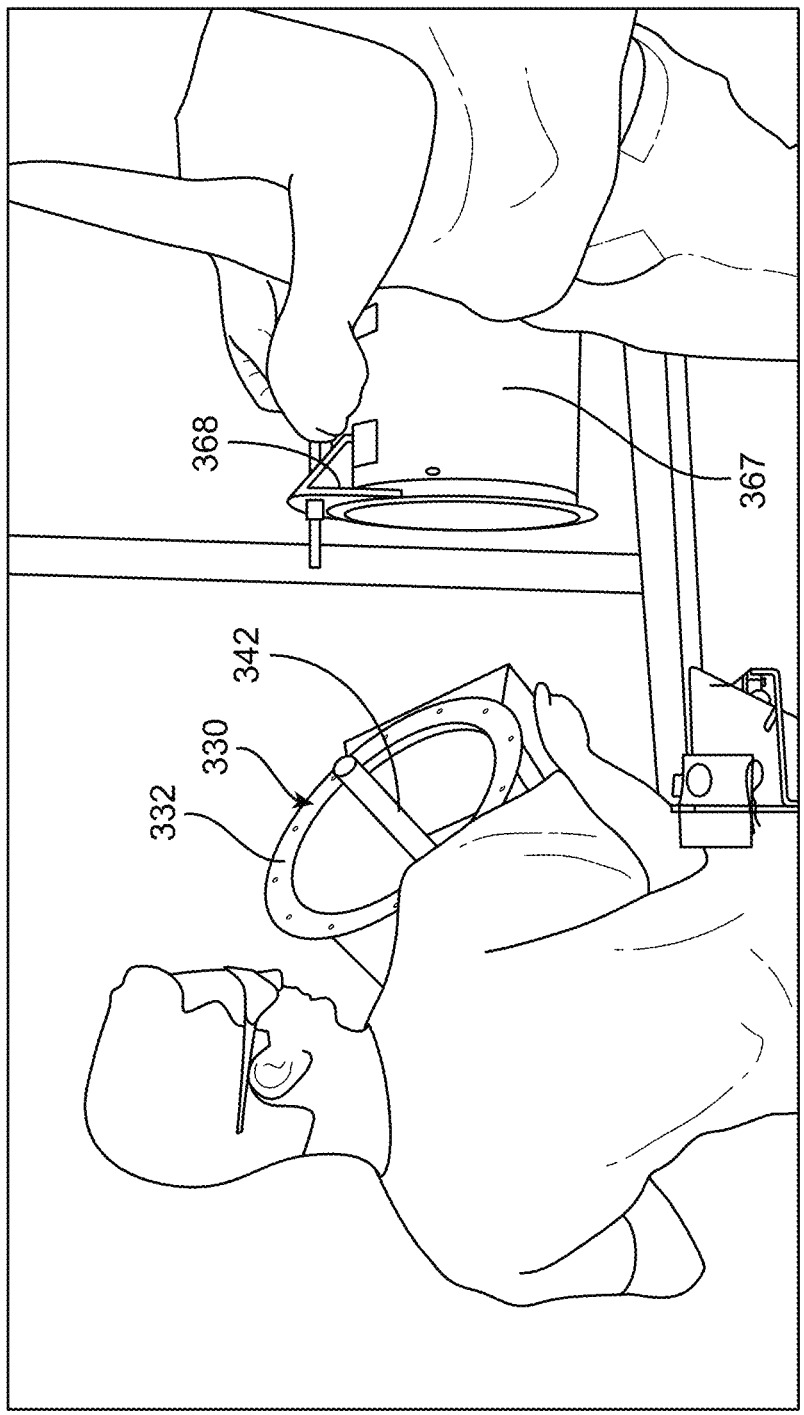

AUTOMATED HEMP FLOWER HARVESTER MACHINERY AND APPARATUSES, METHODS RELATING TO SAME

CROSS-REFERENCE TO RELATED APPLICATIONS

This application claims priority to U.S. Provisional Patent Application No. 62/855,595, entitled "Automated Hemp Flower Harvester Machinery and Apparatuses, Methods Relating to Same," filed on May 31, 2019, the disclosure of which is incorporated by reference herein in its entirety.

BACKGROUND

The demand for cannabis-based products has been increasing in recent years. For example, cannabidiol (CBD) oil is a natural, non-psychoactive concentrate that can be extracted from the stalks and seeds of cannabis plants such as hemp. Additionally, cannabis plants produce flowers that can be consumed for medical and recreational purposes. Due to the texture, moisture level, size, and weight of cannabis flowers, however, typical farming equipment cannot efficiently harvest cannabis plants and separate the flowers from the stalks.

Thus, there is a need for systems and methods of increasing the efficiency and productivity of harvesting hemp flower.

SUMMARY

In some embodiments, a system includes an open sieve and an auger tip. The open sieve includes an outer frame and a set of crossbars. The outer frame and the set of crossbars collectively define a plurality of openings. The open sieve is configured to be disposed within a combine harvester below a chaffer of the combine harvester such that flower material can fall from the chaffer and pass through the plurality of openings. The auger tip includes a tubular portion and a flange. The tubular portion has a first end, a second end, and defines an interior cavity. The flange is coupled to the first end and is configured to be coupled to an auger housing portion of the combine harvester such that an auger within the auger housing portion can transport the flower material to the interior cavity of the tubular portion. The tubular portion defines an opening in a sidewall of the tubular portion such that the flower material within the interior cavity can fall through the opening in the sidewall.

DETAILED DESCRIPTION

In some embodiments, a system includes an open sieve and an auger tip. The open sieve includes an outer frame and a set of crossbars. The outer frame and the set of crossbars collectively define a plurality of openings. The open sieve is configured to be disposed within a combine harvester below a chaffer of the combine harvester such that flower material can fall from the chaffer and pass through the plurality of openings. The auger tip includes a tubular portion and a flange. The tubular portion has a first end, a second end, and defines an interior cavity. The flange is coupled to the first end and is configured to be coupled to an auger housing portion of the combine harvester such that an auger within the auger housing portion can transport the flower material to the interior cavity of the tubular portion. The tubular portion defines an opening in a sidewall of the tubular portion such that the flower material within the interior cavity can fall through the opening in the sidewall.

In some embodiments, a method includes installing an open sieve in place of a previously-installed sieve of a combine harvester, the open sieve defining a first opening and a second opening. A fan belt can be removed from the combine harvester such that the fan of the combine harvester is disabled. A previously-installed first auger tube portion of the combine harvester can be uncoupled from a previously-installed second auger tube portion of the combine harvester. An auger tip can be coupled to the first auger tube portion. A bin agitator can be installed within the grain bin of the combine harvester. The bin agitator can be coupled to or include a motor (e.g., a hydraulic motor) configured to control the rotation of the bin agitator. The motor can be coupled to a hydraulic interface of the combine harvester via hydraulic hoses such that the hydraulic interface of the combine harvester can control the actuation and direction of rotation of the bin agitator. In some embodiments, the motor can be any suitable motor configured to rotate an elongated member of the bin agitator.

In some embodiments, a method includes receiving plant material into a concave portion of a combine harvester. The plant material can be threshed with a threshing drum of the combine harvester in the concave portion such that the plant material is separated into flower material and stalk material. The stalk material and the flower material can be sorted such that the stalk material is deposited out of the back of the combine harvester and the flower material passes through an open sieve and is conveyed to a grain bin of the combine harvester. The flower material can be carried out of the grain bin to an external container via an auger tip coupled to an auger housing portion, the auger tip defining an opening in a sidewall of a tubular portion of the auger tip through which the flower material can pass to the external container.

Figure 1A:
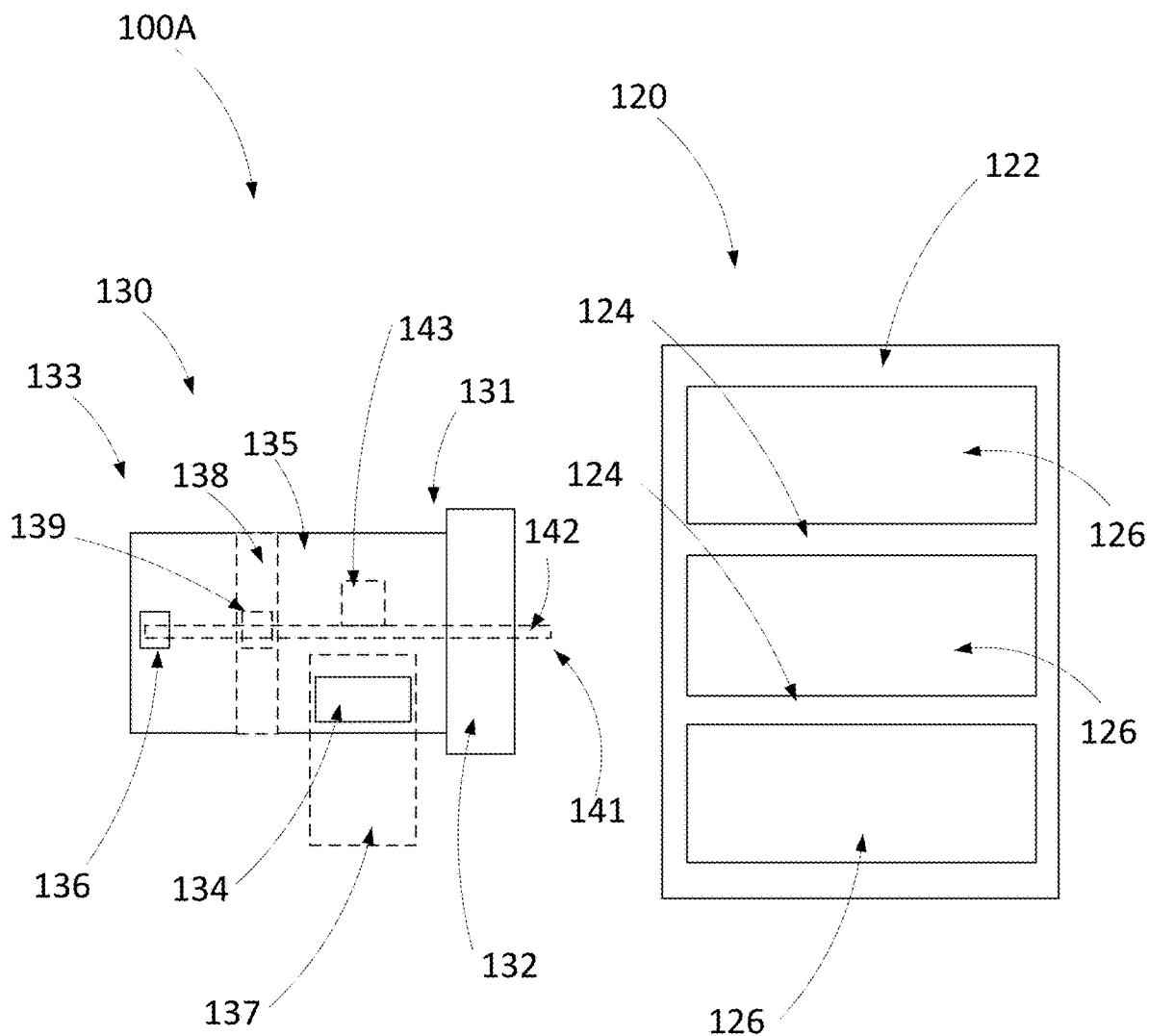
FIG. 1A is a schematic block diagram of a system, according to an embodiment.

FIG. 1A is a schematic illustration of a system 100A. The system 100A can include an open sieve 120 and an auger tip 130. In some embodiments, the open sieve 120 and the auger tip 130 can be included in a combine harvester. In some embodiments, the open sieve 120 and the auger tip 130 can be included in a kit of components for modifying a combine harvester. In some embodiments, the open sieve 120, the auger tip 130, and a bin agitator such as any of the bin agitators described herein can be included in a kit of components for modifying a combine harvester or in a combine harvester. In some embodiments, a kit may include only a subset of the components described herein.

The open sieve 120 includes an outer frame 122 and a set of crossbars 124. The outer frame 122 and the set of crossbars 124 define a plurality of openings 126. In some implementations, the outer frame 122 can include a first elongated member, a second elongated member, a third elongated member, and a fourth elongated member, each elongated member including a first end and a second end. The first end of the first elongated member can be coupled to the second end of the second elongated member. The first end of the second elongated member can be coupled to the second end of the third elongated member. The first end of the third elongated member can be coupled to the second end of the fourth elongated member. The first end of the fourth elongated member can be coupled to the second end of the first elongated member. Thus, the first elongated member and the third elongated member can be opposed disposed parallel to each other, and the second elongated member and the fourth elongated member can be opposed and disposed parallel to each other. Each crossbar of the set of crossbars 124 can extend from the second elongated member to the fourth elongated member and be disposed parallel to one another and to the first elongated member and the third elongated member. Although two crossbars 124 are shown in FIG. 1A, the set of crossbars 124 can include any suitable number of crossbars 124 such as, for example, three crossbars 124.

In some implementations, the open sieve 120 can define a number of openings 126 equal to one more than the number of crossbars 124. For example, as shown in FIG. 1A, the open sieve 120 can define three openings extending from a top surface to a bottom surface of the open sieve 120. A first opening 126 can be collectively defined by the first elongated member, a first portion of the second elongated member, a first crossbar, and a first portion of the fourth elongated member. A second opening 126 can be collectively defined by the first crossbar, a second portion of the second elongated member, a second crossbar, and a second portion of the fourth elongated member. A third opening 126 can be collectively defined by the second crossbar, a third portion of the second elongated member, the third elongated member, and a third portion of the fourth elongated member.

In some implementations, the open sieve 120 can be shaped sized such that the overall length (e.g., distance between an outer edge of the first elongated member and an outer edge of the third elongated member) and width (e.g., distance between an outer edge of the second elongated member and an outer edge of the fourth elongated member) of the open sieve 120 is the same as the overall length and width of a pre-existing sieve of a combine harvester. For example, the open sieve 120 can have substantially the same length and width as the original sieve included in any of the series 80 to 88 combine machines and/or the 1400-2500 Series Case IH Axial-Flow Combines. The openings 126 of the open sieve 120 can be significantly larger, however, than openings defined through a pre-existing sieve of a combine harvester. Thus, the open sieve 120 can be configured to replace the pre-existing sieve of a combine harvester such that, during operation of the combine harvester, larger material can pass through the open sieve 120 and travel toward a grain bin of the combine harvester than could pass through the pre-existing sieve. In some embodiments, the space defined by the outer frame 122 of the open sieve 120 can be open from an upper surface to a lower surface of the outer frame 122 except for the crossbars 124 and optional support brackets coupling and/or reinforcing the adjacent elongated members. For example, the open sieve 120 can include no crossbars or other components between the first elongated member and the third elongated member that extend parallel to the second elongated member and the fourth elongated member. In some implementations, the outer frame 122 can define a space that is open from an upper surface to a lower surface of the outer frame 122 between the crossbars 124 (e.g., between the first crossbar 124 and the second crossbar 124). In some embodiments, an opening 126 of the plurality of openings 126 defined between a first crossbar 124 and an adjacent second crossbar 124 is unobstructed between a first plane including an upper surface of each of the first crossbar 124 and the second crossbar 124 to a second plane including a lower surface of each of the first crossbar 124 and the second crossbar 124. In some embodiments, the plurality of openings 126 can each be sufficiently large such that flower material (e.g., cannabis flowers) can fall freely through the openings 126 without any crossbars (e.g., crossbars 124 and/or any crossbars extending perpendicular to crossbars 124) preventing the flower material from falling through the open sieve 120.

The auger tip 130 includes a tubular portion 135 and a flange 132. The tubular portion 135 has a first end 131, a second end 133, and defines an interior cavity. The first end 131 can be an open end and the second end 133 of the tubular portion 135 can be a closed end. The flange 132 is coupled to the first end 131 of the tubular portion 135 and extends outward from the tubular portion 135 relative to a central axis of the tubular portion 135. The tubular portion 135 defines an opening 134 in a sidewall of the tubular portion 135. The second end 133 of the tubular portion can define an opening 136 configured to receive a portion of a bearing of an auger and/or of a shaft assembly 141 configured to be coupled to an auger of a combine.

As shown in FIG. 1A, the system 100A can optionally include a shaft assembly 141 at least partially disposed within the interior cavity of the tubular portion 135. The shaft assembly 141 includes a shaft 142 (e.g., a shaft having a hexagonal cross-section ("a hex shaft") or an octagonal shaft). The shaft assembly 141 optionally includes an extension portion 143 coupled to the shaft 142 and extending away from the shaft 142. The extension portion 143 can be any suitable shape (e.g., rectangular, rounded) and can be attached to the shaft 142 such that rotation of the shaft 142 causes the extension portion 143 to rotate in a plane including the opening 134. The shaft assembly 141 can include or be coupled to a bearing assembly (not shown) (e.g., a bearing configured to engage with a shaft having a hexagonal cross-section ("a hex bearing") and associated nuts and screws) disposed at a second end of the shaft 142. The bearing assembly can be disposed within the opening 136 of the second end 133 of the tubular portion 135. When the shaft 142 is engaged with the bearing assembly and the bearing assembly is disposed within the opening 136 and engaged with the second end 133 of the tubular portion 135, a first end of the shaft can be disposed outside of the interior cavity and opposite the flange 132 from the second end 133 of the tubular portion 135.

The flange 132 is configured to be coupled to an auger housing such that an end portion of an auger disposed within the auger housing can be engaged with the first end of the shaft 142 (e.g., such that rotation of the auger causes rotation of the shaft 142 relative to the tubular portion 135). For example, the flange 132 can define a number of through-holes through which fasteners (e.g., bolts or screws) can be inserted to engage the flange 132 with a flange of the auger housing. The end of the auger disposed within the auger housing can include a mating feature that corresponds to the first end of the shaft 142. For example, the end of the auger can include a recess having a complementary shape to the first end of the shaft 142 (e.g., hexagonal) such that the recess can receive and rotatably engage with the first end of the shaft 142. Thus, the auger can rotate to convey flower material from a grain bin of a combine harvester, through the auger housing, through the first end 131 of the auger tip 130, into the interior cavity of the auger tip 130. The flower material can then fall through the opening 134 (e.g., into a chute coupled to the opening 134 and/or into a container of a truck). In embodiments including the extension member 143, the extension member 143 can urge flower material toward the opening 134 as the extension member 143 rotates within the interior cavity of the tubular portion 135. Additionally, when the flange 132 is coupled to the auger housing and the shaft 142 is engaged with the auger, the shaft 142 and auger tip 130 can support a portion of the weight of the auger.

In some implementations, the auger tip 130 can include an outlet housing portion 137 that extends from the tubular portion 135 and forms an outlet passage including and/or extending from the opening 136. The outlet housing portion can have any suitable cross-sectional shape (e.g., rectangular, circular, ovular). A central axis of the outlet housing portion 137 can be perpendicular to a central axis of the tubular portion 135 and/or a central axis of the shaft 142.

In some implementations, the auger tip 130 can include an inner wall 138 disposed between the opening 134 and the second end 133 of the tubular portion 135. The inner wall 138 can define an opening 139 that is coaxial with the opening 136 in the second end 133 of the tubular portion 135. The inner wall 138 can be disposed in a plane that is parallel to a plane including the second end 133. The inner wall 138 and the second end 133 can be configured to support a portion of an auger or a shaft coupleable to an auger (e.g., a hex shaft or an octagonal shaft) disposed within the opening 139 and the opening 136. For example, the inner wall 138 can be engaged with a bearing assembly (e.g., a hex bearing and associated nuts and screws) such that a bearing is disposed within the opening 139. The shaft 142 can be configured to be engaged with the bearing disposed within the opening 139 such that the bearing associated with the opening 139 and the bearing associated with the opening 136 can rotate with the shaft 142 under the control of an auger to which the shaft 142 is coupled via the first end of the shaft 142. In some implementations, the inner wall 138 can be coplanar and/or monolithically formed with a wall forming a portion of the outlet housing portion 137. The inner wall 138 and the second end 133 can collectively support at least a portion of the weight of the shaft 142 and a portion of the weight of the auger.

The tubular portion 135 of the auger tip 130 can also define an opening in a sidewall of the tubular portion 135 disposed between the inner wall 138 and the second end 133. The opening can be configured such that a user can access an interior space defined between the inner wall 138 and the second wall 133 via the opening (e.g., to perform installation or repair on a bearing assembly or a portion of an auger or shaft coupled to an auger disposed in the interior space). The opening can optionally be covered by a removeable door.

In some implementations, the auger tip 130 can be shaped sized such that an inner diameter and/or an outer diameter of the tubular portion 135 is substantially similar to the inner diameter or outer diameter, respectively, of a pre-existing auger housing of a combine harvester. For example, the tubular portion 135 can have substantially the same inner diameter and/or outer diameter as an original auger housing included in any of the series 80 to 88 Case International Harvester (IH) combine machines and/or the 1400-2500 Series Case IH Axial-Flow Combines. The length of the auger tip 130 can be shorter than a length of the original auger housing. Thus, the auger tip 130 can be configured to replace an auger housing (or a portion of an auger housing) of a combine harvester and support an end or bearing associated with an auger disposed within a remaining auger housing (or remaining portion of the auger housing) such that, during operation of the combine harvester, material be conveyed to the auger tip 130 from a grain bin of the combine harvester and can fall through the opening 134 for collection in an external container (e.g., a truck bed).

Although not shown in FIG. 1A, the system 100A can also include a bin agitator configured to be disposed within a grain bin of the combine harvester. The bin agitator can include, for example, an elongated member or bar with a set of bar segments extending from the bar at a non-zero angle relative to a central axis of the bar. The bar segments can be spaced apart from one another and sufficiently long to contact flower material within the grain bin and urge the flower material toward an auger housing and/or an end of an auger disposed in the grain bin such that the auger can transport the flower material to the auger tip. The bin agitator can include any suitable number of bar segments, such as one, two, three, four, five, or more. The bar segments can extend away from the elongated bar at a different angle from one or more adjacent bar segments relative to a central axis of the elongated bar. The system 100A can also include any suitable mounting components to mount the bin agitator within the grain bin. The system 100A can also include a motor configured to rotate the elongated bar. In some embodiments, the motor can be a hydraulic motor and the system 100A can include hoses (e.g., hydraulic hoses) configured to couple the motor of the bin agitator to a hydraulic actuator of the combine harvester such that an interface of the combine harvester can be used to control the actuation and direction of rotation of the bin agitator.

Figure 1B:
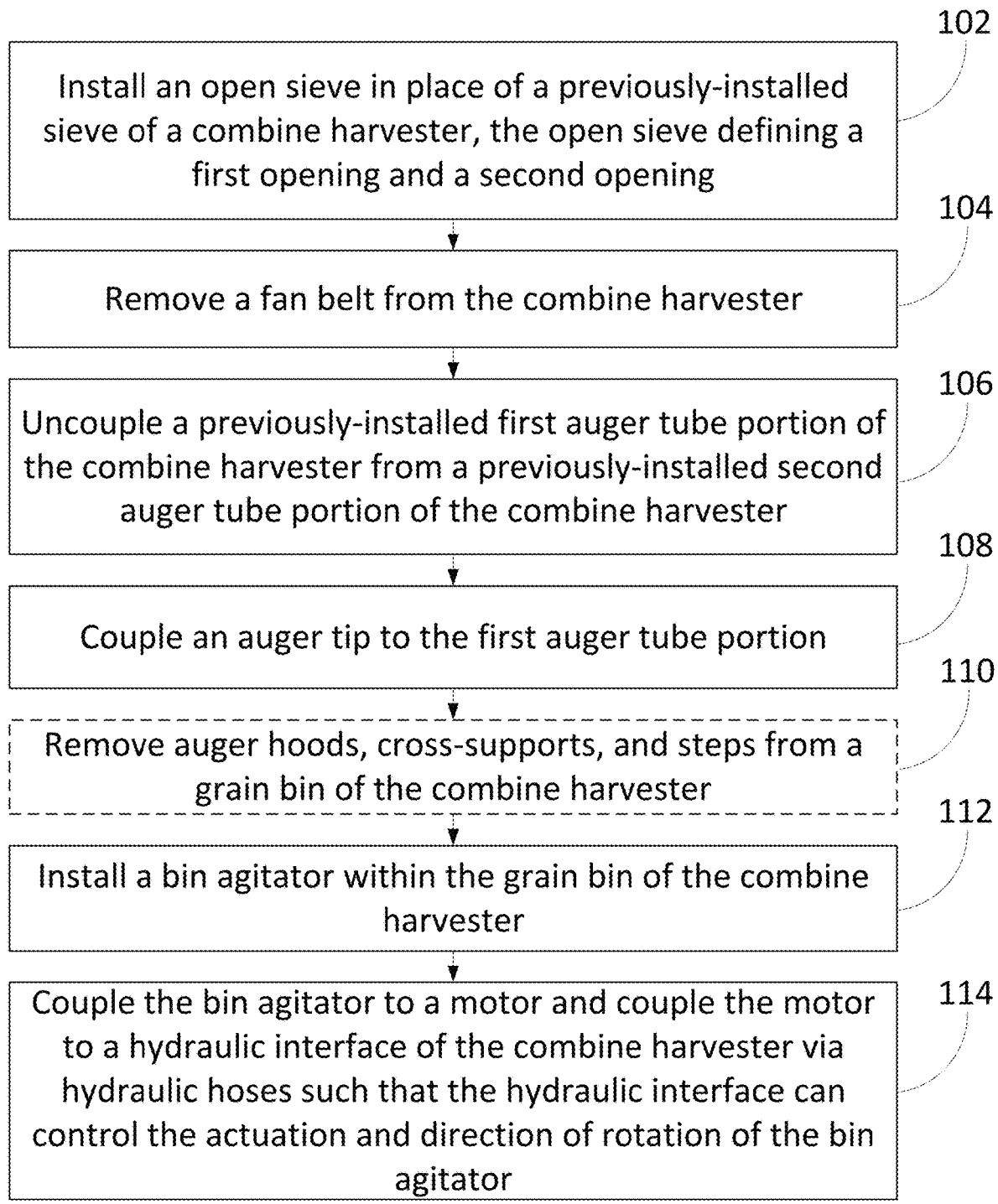
FIG. 1B is a flow chart of a method, according to an embodiment.
Figure 1C:
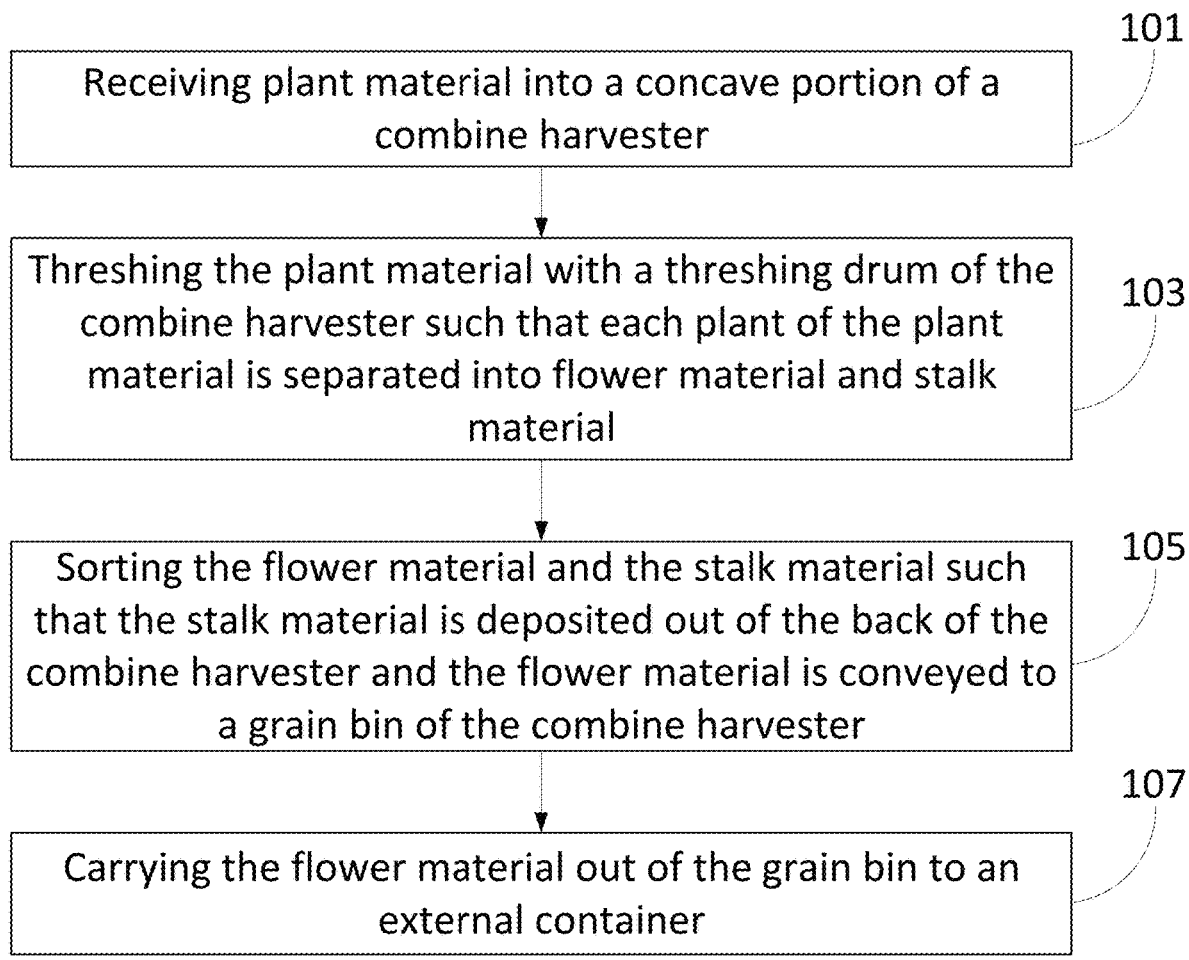
FIG. 1C is a flow chart of a method, according to an embodiment.
Figure 1D:
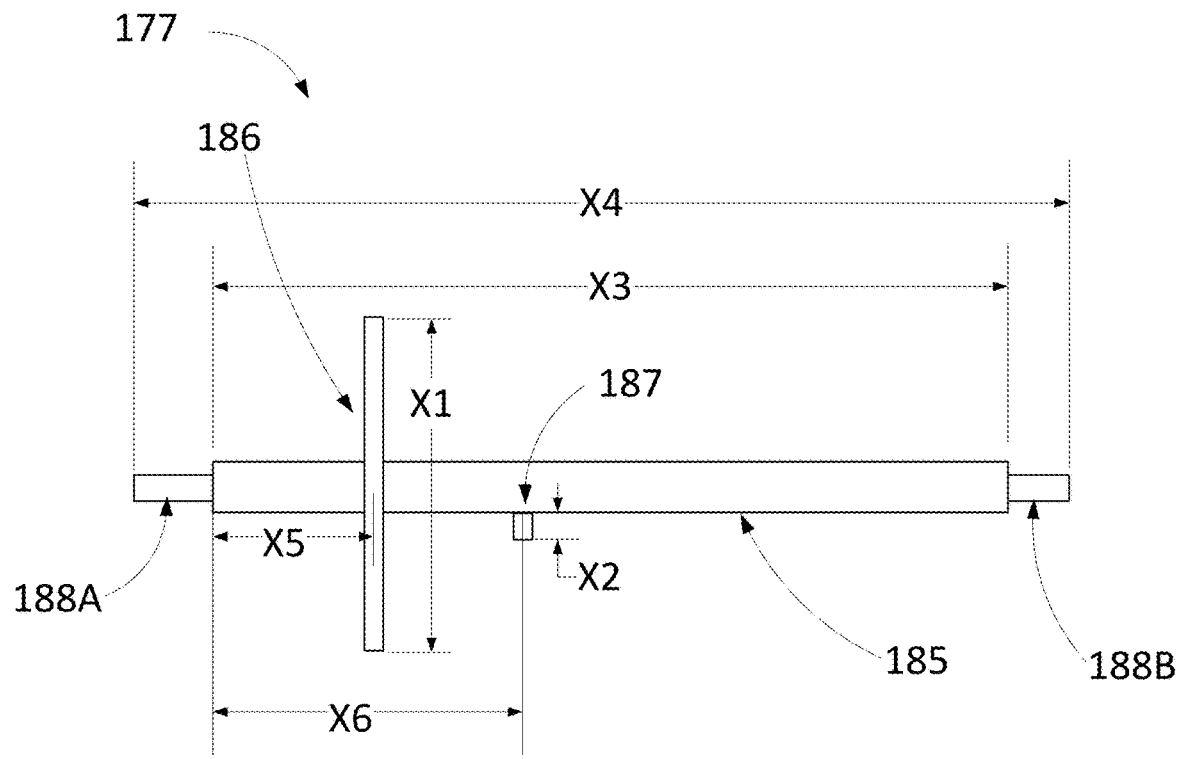
FIGS. 1D and 1E are schematic illustrations of a portion of a bin agitator of the system of FIG. 1A, according to an embodiment.
Figure 1E:
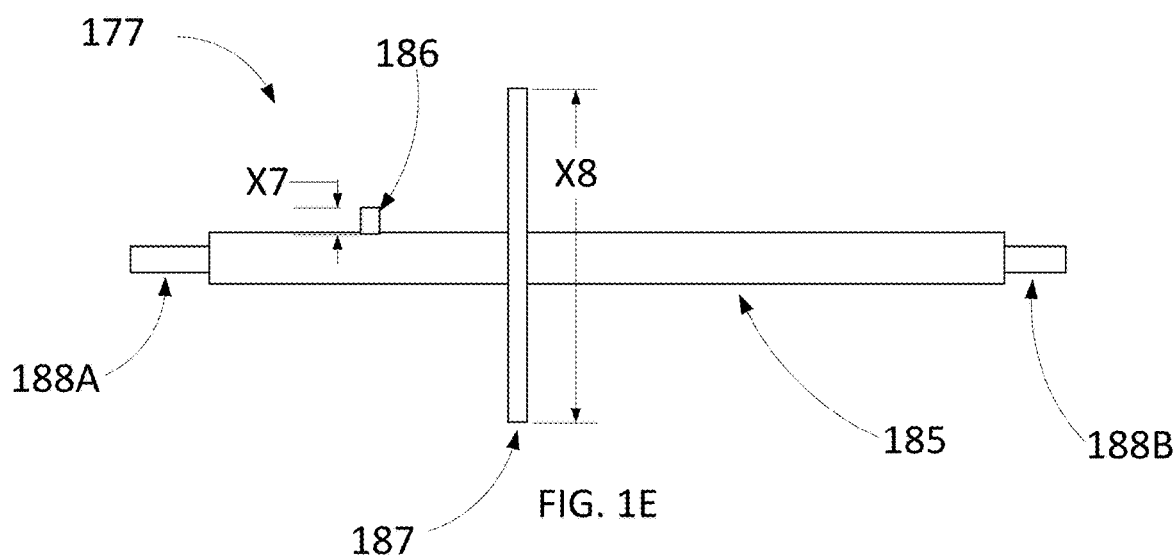

For example, FIGS. 1D and 1E are a top view and a side view, respectively, of a bin agitator 177 that can be included in the system 100A, or any of the systems described herein. The bin agitator 177 includes an elongated member 185, a first bar segment 186, and a second bar segment 187. FIG. 1E shows the bin agitator 177 rotated 90 degrees about a central axis of the elongated member 185 relative to the position of the bin agitator in FIG. 1D. The elongated member 185 can have, for example, a square or rectangular cross-section, such that the elongated member 185 has four elongated sides extending from a first end to a second end of the elongated member 185. The first bar segment 186 can be coupled (e.g., mounted) to a first side of the elongated member 185 and the second bar segment 187 can be mounted to a second side of the elongated member 185 such that the first bar segment 186 and the second bar segment 187 are disposed perpendicularly relative to each other. The elongated member 185 can be coupled to mounting components (e.g., mounting components included in the bin agitator 177) such that the elongated member 185 can be mounted to a grain bin and the elongated member 185, the first bar segment 186, and the second bar segment 187 can be rotated relative to the grain bin. A first mounting bracket (e.g., an L-shaped bracket) can be configured to couple a first end of the elongated member 185 to a first wall of the grain bin and a second mounting bracket (e.g., a flat bracket) can be configured to couple a second end of the elongated member 185 to a second wall of the grain bin. For example, the bin agitator 177 can include a first tubular member 188A and a second tubular member 188B on each end of the elongated member 185 that are configured to be disposed within openings of respective mounting plates such that the elongated member 185 can rotate relative to the openings of the mounting plates. In some embodiments, the mounting plates can include bearings configured to receive the first tubular member 188A and the second tubular member 188B, respectively, for rotational movement. In some embodiments, each of the first tubular member 188A and the second tubular member 188B can have a circular cross-section. The diameter of each of the first tubular member 188A and the second tubular member 188B can be less than the thickness of the elongated member 185. The first tubular member 188A and the second tubular member 188B can be the same or different in structure and/or function. In some embodiments, the first tubular member 188A can include a recess defined to receive a key of the bin agitator 177 such that the elongated member 185 can be mated with a motor via the first tubular member 188A via the key and the elongated member 185 can rotate under the control of the motor.

In some embodiments, the length X1 of the first bar segment 186 and/or the length X8 of the second bar segment 187 can be, for example, about 38 inches. In some embodiments, the length X1 and/or the length X8 can be, for example, between 30 inches and 45 inches. In some embodiments, the length X1 and/or the length X8 can be, for example, between about 35 inches and about 40 inches. In some embodiments, the length X1 and/or the length X8 can be any suitable length such that the bin agitator 177 does not contact other components disposed within or walls of the grain bin when mounted to the grain bin and rotating to urge flower material toward an auger for carrying the flower material out of the grain bin.

In some embodiments, the width X2 of the second bar segment 187 and the width X7 of the first bar segment 186 can be, for example, between about 0.5 inches and about 3 inches, between about 1 inch and 2 inches, about 1 inch, or about 2 inches. In some embodiments, the length X3 of the elongated member 185 can be, for example, about 6 feet. In some embodiments, the length X3 can be any suitable length such that the bin agitator 177 can be mounted in the grain bin to contact and urge the flower material, such as, for example, between about 5 feet and 7 feet or between about 5.5 ft and 6.5 ft. In some embodiments, the overall length X4 of the elongated member 185, the first bar segment 186, and the second bar segment 187 can be, for example, about 76 inches. In some embodiments, the length X4 can be any suitable length such that the bin agitator 177 can be mounted in the grain bin to contact and urge the flower material, such as, for example, between about 70 inches and 82 inches, between about 72 inches and 80 inches, or between about 65 inches and 87 inches.

In some embodiments, the first bar segment 186 and the second bar segment 187 can both be disposed on a first half of the elongated member 185. In some embodiments, no bar segments are coupled to the opposite half of the elongated member 185 from the first bar segment 186 and the second bar segment 187. In some embodiments, the first bar segment 186 and the second bar segment 187 can be disposed on the elongated member 185 such that, when the bin agitator 177 is installed in the grain bin, the first bar segment 186 and the second bar segment 187 can urge flower material in the grain bin toward an auger that carries flower material toward the auger tip 130. For example, an end of the auger disposed in the grain bin can be aligned with a portion of the elongated member 185 between the first bar segment 186 and the second bar segment 187, or with one of the first bar segment 186 or the second bar segment 187. In some embodiments, the first bar segment 186 can be disposed a distance X5 from the end of the elongated member 185 coupled to the first tubular member 188A (e.g., the end coupled to a motor of the bin agitator 177, and the second bar segment 187 can be disposed a distance X6 from the end of the elongated member 185 coupled to the first tubular member 188A. In some embodiments, the distance X5 can be, for example, 17.5 inches and the distance X6 can be, for example, 29.5 inches. In some embodiments, the distance X5 can be, for example, between about 15 inches and 20 inches, and the distance X6 can be between about 25 and 35 inches. In some embodiments, the distance X6 can be less than twice the distance X5.

In some embodiments, the elongated member 185 can be formed of, for example, steel tubing. In some embodiments, the first bar segment 186 and/or the second bar segment 187 can be formed of, for example, steel tubing. In some embodiments, the first bar segment 186 and the second bar segment 187 can each include a short tubing section coupled to the elongated member 185 (e.g., via welding and/or a mounting bracket) and a longer tubing section or longer rod disposed within a lumen of the short tubing section and secured to the short tubing section. The short tubing section can be about 12 inches long, and the longer tubing section or rod can be about 38 inches long. In some embodiments, the short tubing section can be between about 9 inches and 15 inches long, between about 5 inches and about 20 inches long, or any other suitable length such that the short tubing section can support the longer tubing section. The longer tubing section can be, for example, between 30 inches and 45 inches, between about 35 inches and about 40 inches, or any suitable length such that the bin agitator 177 does not contact other components disposed within or walls of the grain bin when mounted to the grain bin and rotating to urge flower material toward an auger for carrying the flower material out of the grain bin. In some embodiments, rather than the first bar segment 186 and the second bar segment 187 being mounted to an outer surface of the elongated member 185, the first bar segment 186 and the second bar segment 187 can be disposed through openings defined by the elongated member 185 or can be integrally formed with the elongated member 185.

Additionally, the system 100A can also include an air obstruction component configured to be disposed over an opening of a combine harvester via which a fan of the combine harvester can blow air into a portion of the combine harvester through which the plant material is passing such that air cannot pass into the plant material, even if the combine harvester is moving. The air obstruction component can include, for example, a piece of cloth that can be bolted to the combine harvester over the fan opening.

FIG. 1B is a flow chart showing a method 100B. The method 100B includes installing 102 an open sieve in place of a previously-installed sieve of a combine harvester, the open sieve defining a first opening and a second opening. The open sieve can be the same or similar in structure and/or function to any of the open sieves described herein, such as the open sieve 120 described above. The combine harvester can the same or similar in structure and/or function to any of the combine harvesters described herein. A fan belt can be removed 104 from the combine harvester such that the fan of the combine harvester is disabled. A previously-installed first auger tube portion of the combine harvester can be uncoupled 106 from a previously-installed second auger tube portion of the combine harvester. An auger tip can be coupled 108 to the first auger tube portion. The auger tip can be the same or similar in structure and/or function to any of the auger tip portions described herein, such as the auger tip 130. Coupling the auger tip to the first auger tube portion can include coupling a shaft of the auger tip to an end of an auger disposed within the auger tube portion such that the shaft is rotatable by the auger and/or supports the end of the auger. Existing auger hoods, cross-supports, and/or steps can be removed 110 from a grain bin of the combine harvester. A bin agitator can be installed 112 within the grain bin of the combine harvester. The bin agitator can be coupled to a motor configured to control the rotation of the bin agitator. The motor can be coupled to a hydraulic interface of the combine harvester via hydraulic hoses such that the hydraulic interface of the combine harvester can control the actuation and direction of rotation of the bin agitator 114.

FIG. 1C is a flow chart showing a method 100C. The method 100C can be performed used any of the systems, kits, or methods described herein. The method 100C can include, optionally, cutting plants and hand rowing the cut plant material into windrows. The plant material can be hand rowed rather than machine rowed to prevent flowers of the plant material from being separated from stalks (also referred to as "stems") of the plant material prior to the plant material being fed into a combine harvester. In some implementations, the plant material can be below or at about a 10-12% moisture level. In some implementations, the plants can be cannabis plants and the plant material can include cannabis plant material.

The method 100C can include receiving 101 the plant material into a concave portion of the combine harvester. For example, the combine harvester can include a standard pickup header. The pickup header can pick up a portion of the plant material and pull it into the concave portion of the combine harvester (via, e.g., a grain conveyor).

The plant material can be threshed 103 by a threshing drum of the combine harvester in the concave portion such that each plant of the plant material is separated into flower material and stalk material (e.g., the flowers of the plant material are separated (e.g., broken) from stalks). During the threshing, in some implementations, no air is flowing from a fan through the concave portion (e.g., due to a fan belt associated with the fan being disabled and/or an air obstruction component blocking an opening through which air could passes from the fan to the plant material). Although air can be used to separate lighter weight materials from heavier materials for some plant material (e.g., separating corn from corn husks), plant material such as cannabis have stalks that are heavier than the flowers that grow off the stalks. Thus, air flow could cause the flowers to travel to an unintended location relative to the combine harvester.

The stalk material and the flower material of the plant material can then be sorted 105 such that the stalks are deposited out of the back of the combine harvester and the flower material is conveyed to a grain bin of the combine harvester. For example, after threshing, the plant materials can be moved to a chaffer via a straw walker. The chaffer can be disposed over and above an open sieve, such as the open sieve 120 shown and described above with respect to FIG. 1A. When the plant material reaches the chaffer, since the stalks are larger than the flowers and openings in the chaffer are larger than the flowers and smaller than the stalks, the flower material can fall through openings in the chaffer and the stalks can travel on top of the chaffer and out of the back of the combine harvester. The flower material can travel to an auger or grain elevator configured to transport the flowers to the grain bin.

The flower material can be carried 107 out of the grain bin to an external container. For example, an auger having a first end in the grain bin and a second end engaged with a shaft (e.g., the shaft 142) associated with an auger tip (e.g., the auger tip 130) can convey the flower material through the auger housing and into the auger tip coupled to an end of the auger housing and configured to support an end portion of the auger. The auger tip can be the same or similar in structure and/or function to the auger tip 130 described above with respect to FIG. 1A. For example, the auger tip can have a downward-facing opening in a bottom surface of the auger tip such that the flower material can fall through the opening and travel to the external container after entering an interior cavity of the auger tip. The auger tip can be coupled to a chute such that the flower material can travel from the auger trip through the chute and to the external container. In some implementations, the external container is a truck bed or truck (e.g., a chain floor truck). In some implementations, a bin agitator can be disposed within the grain bin to urge the flower material toward the auger housing and/or the auger such that the auger can convey the flower material from the grain bin to the auger tip.

In some implementations, the flower material can be carried out of the grain bin to the external container constantly while the combine harvester is operating (e.g., during substantially the entire duration of time that the combine harvester is receiving plant material into the concave) such that the flower material does not build up in the grain bin or does not build up in the grain bin above a threshold level (e.g., a threshold height and/or a threshold weight). Constantly removing the flower material from the grain bin prevents the flower material in the grain bin from becoming too heavy and/or compressed to be able to be conveyed out of the grain bin via the auger. Thus, the receiving, threshing, sorting, and carrying can be performed simultaneously on different sub-portions of the plant material such that the flower material disposed in the grain bin does not increase above a threshold level. The external container (e.g., truck bed) can be advanced (e.g., driven or pulled) parallel to the combine harvester as the combine harvester receives plant material and flower material passes from the auger tip to the external container.

Figure 2A:
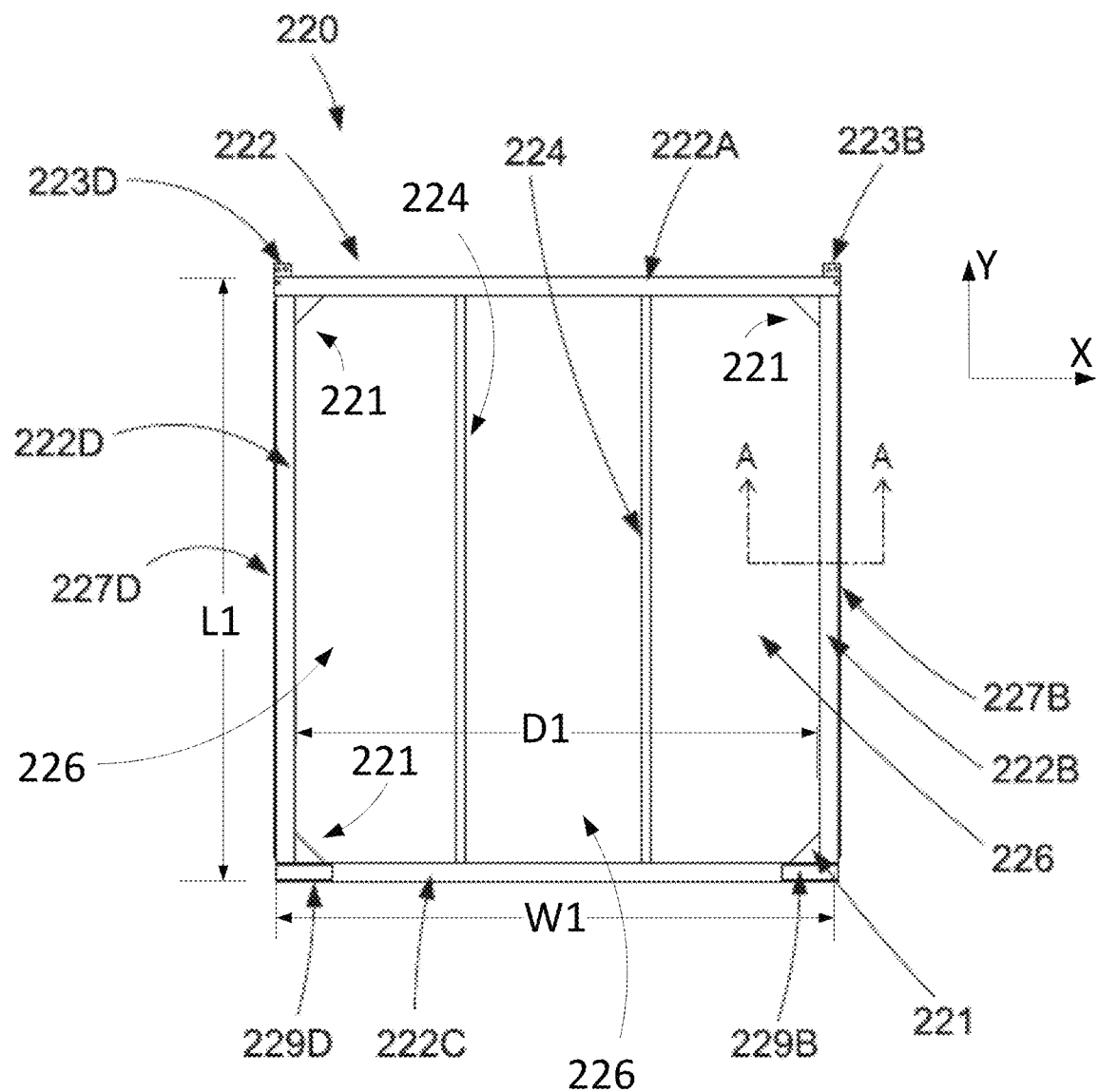
FIGS. 2A-2Q are various views of an open sieve and components thereof, according to an embodiment.
Figure 2B:
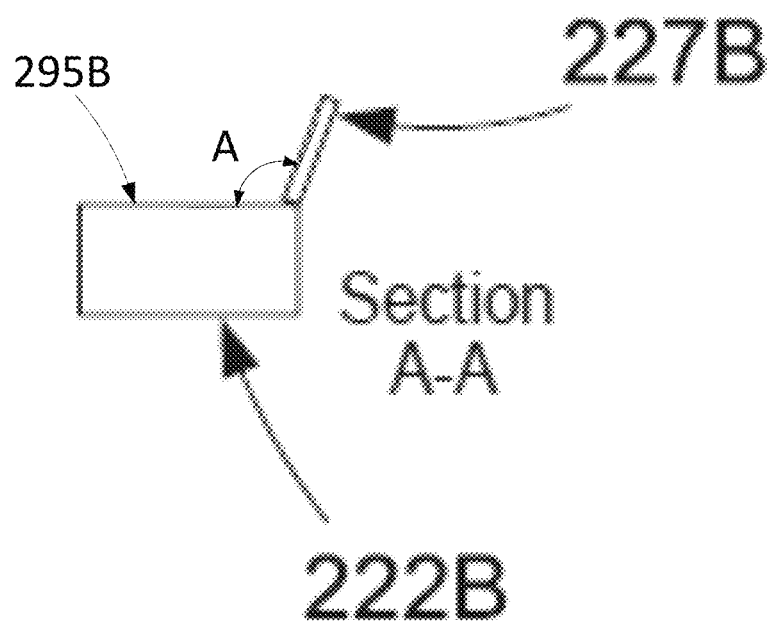
Figure 2C:
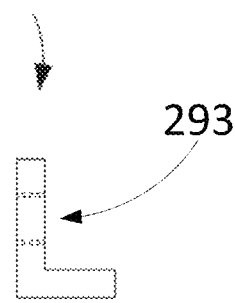
Figure 2D:
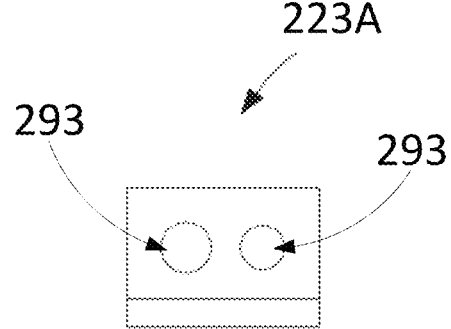
Figure 2E:
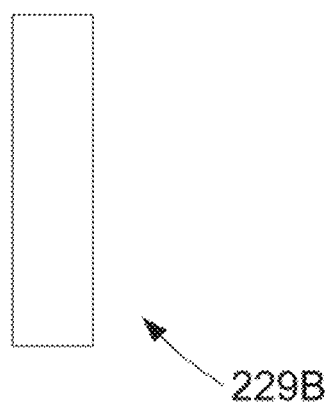
Figure 2F:
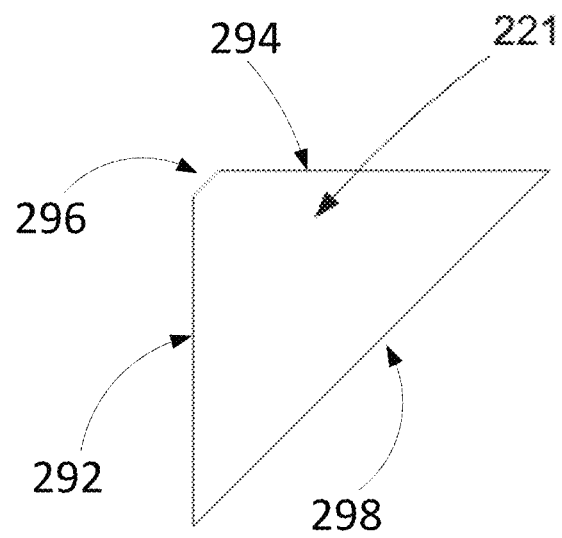
Figures 2N, 2O:
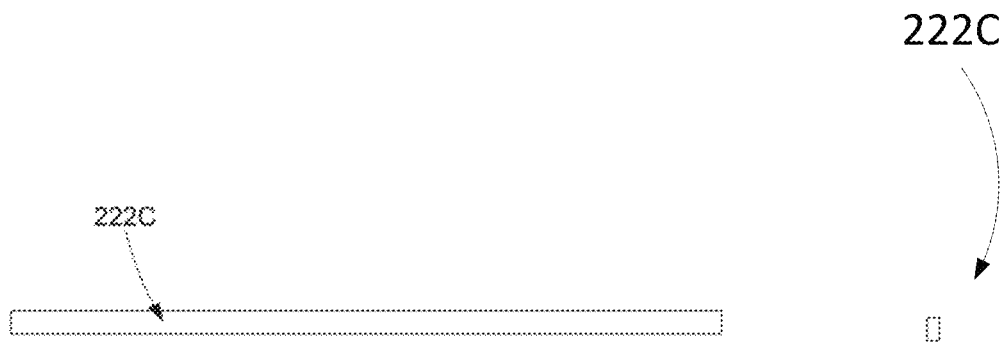
Figure 2P:
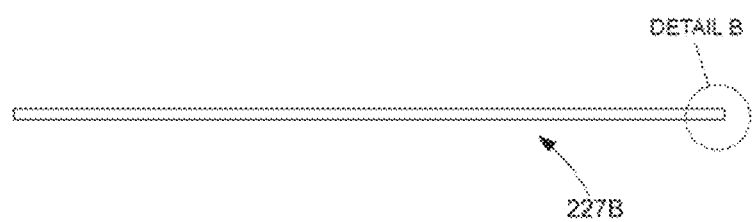
Figure 2Q:
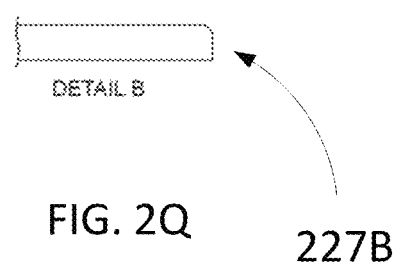

FIGS. 2A-2Q are various views of an open sieve 220 and components of the open sieve 220. The open sieve 220 can be the same or similar in structure and/or function to the open sieve 120 described above with respect to the system 100. For example, FIG. 2A shows a top view of the open sieve 220. The open sieve 220 includes an outer frame 222 and a set of crossbars 224. The outer frame 222 and the set of crossbars 224 collectively define a plurality of openings 226.

As shown, the outer frame 222 can include a first elongated member 222A, a second elongated member 222B, a third elongated member 222C, and a fourth elongated member 222D, each elongated member including a first end and a second end. The first end of the first elongated member 222A can be coupled to the second end of the second elongated member 222B. The first end of the second elongated member 222B can be coupled to the second end of the third elongated member 222C. The first end of the third elongated member 222C can be coupled to the second end of the fourth elongated member 222D. The first end of the fourth elongated member 222D can be coupled to the second end of the first elongated member 222A. Thus, the first elongated member 222A and the third elongated member 222C can be opposed and parallel and the second elongated member 222B and the fourth elongated member 222D can be opposed and parallel. The first elongated member 222A and the third elongated member 222C can be disposed perpendicularly to each of the second elongated member 222B and the fourth elongated member 222D. Each crossbar of the set of crossbars 224 can extend from the first elongated member 222A to the third elongated member 222B and be disposed parallel to one another and to the second elongated member 222B and the fourth elongated member 222D. In some embodiments, the crossbars 224 can be disposed relative to the second elongated member 222B and the third elongated member 222D such that the openings 226 have even widths taken along an X-axis.

The outer frame 222 can have any suitable overall length and width such that the outer frame 222 can be disposed in an interior rear cavity of a combine in place of another sieve. For example, as shown in FIG. 2A, the outer frame 222 can have a length L1 and a width W1. The length L1 can be, for example, between about 60 inches and about 70 inches, between about 63 inches and 66 inches, between about 64 inches and about 65 inches, or about 64.813 inches. The width W1 can be, for example, between about 55 inches and about 65 inches, between about 59 inches and about 61 inches, about 60.625 inches, about 59.875 inches, or about 60 inches. Each of the crossbars 224 can have any suitable width. For example, each crossbar can have a width of about 1 inch. The distance D1 between the second elongated member 222B and the fourth elongated member 222D can be, for example, between about 51 inches and about 61 inches, between about 55 inches and about 57 inches, about 56.625 inches, about 55.875 inches, or about 56 inches. Each of the openings 226 in FIG. 2A can be, for example, about 18 inches wide (taken along the X-axis) and between about 60 and 62 inches long (e.g., about 60.813 inches) (taken along the Y-axis).

FIGS. 2G and 2H are a top view and an end view, respectively, of the first elongated member 222A. FIG. 2I is an enlarged view of Detail A of FIG. 2G. As shown in FIGS. 2G and 2I, the first elongated member 222A defines an opening 297 on each end of the first elongated member 222A. The openings 297 are configured to receive attachment mechanisms (e.g., screws and/or bolts) such that the open sieve 220 can be secured to a portion of a combine harvester (e.g., a rail or plate). FIGS. 2J and 2K are a side view and an end view, respectively, of the second elongated member 222B. The fourth elongated member 222D can be the same or similar in structure and/or function to the second elongated member 222B. FIGS. 2L and 2M are a top view and an end view, respectively, of a crossbar 224 of the set of crossbars 224. FIGS. 2N and 2O are a top view and an end view, respectively, of the third elongated member 222C.

As shown in FIG. 2A, the set of crossbars 224 includes two crossbars 224. The open sieve 220 defines three openings 226 extending from a top surface to a bottom surface of the open sieve 220. In some embodiments, the set of crossbars 224 can include any suitable number of crossbars 224 (e.g., one, three, or four crossbars). In some embodiments, the open sieve 220 can define any suitable number of openings 226 defined by the outer frame 222 and the crossbars 224 (e.g., one more opening 226 than the number of crossbars 224). In some embodiments, as shown in FIG. 2A, the space defined by the outer frame 222 can be open from an upper surface to a lower surface of the outer frame 222 except for the crossbars 224. For example, the open sieve 220 can include no crossbars or other components between the first elongated member 222A and the third elongated member 222B that extend along or parallel to the X-axis between the second elongated member 222B and the fourth elongated member 222D.

The open sieve 220 can include four support brackets 221 configured to strengthen the attachments between the elongated members 222A-222D at the corners of the outer frame 222. As shown in FIG. 2F, which is a top view of a support bracket 221, each support bracket 221 can have a generally triangular shape. Each support bracket 221 can have a first side 292 coupled to a first elongated member (e.g., the first elongated member 222A) and a second side 294 coupled to a second elongated member (e.g., the second elongated member 222B). Additionally, each support bracket 221 can have a inner side 298 and an outer side 296 disposed in a plane parallel to the inner side 298. Each support bracket 221 can be formed of any suitable material such as, for example, 10 gauge steel plate. Each support bracket 221 can be coupled to the outer frame 222 via, for example, welding.

The open sieve 220 can include a first anchoring bracket 223B and a second anchoring bracket 223D coupled to the first elongated member 222A and extending away from the interior of the frame 222. The open sieve 220 can be configured to be securely mounted to a combine harvester via the first anchoring bracket 223B and the second anchoring bracket 223D. The first anchoring bracket 223B can be coupled adjacent to the first end of the first elongated member 222A such that the first anchoring bracket 223B extends away from the fourth elongated member 222D. The second anchoring bracket 223D can be coupled adjacent to the second end of the first elongated member 222A such that the second anchoring bracket 223D extends away from the second elongated member 222B. The first anchoring bracket 223B and the second anchoring bracket 223D can be coupled to the first elongated member 222A via any suitable method such as, for example, welding such as fillet welding. FIGS. 2C and 2D are a side view and a top view, respectively, of the first anchoring bracket 223A, which can be the same or similar in structure and/or function as the second anchoring bracket 223B. The first anchoring bracket 223A defines openings 293 configured to receive attachment mechanisms (e.g., screws and/or bolts) such that the first anchoring bracket 223A can be secured to a portion of a combine harvester (e.g., a pan). Although FIGS. 2A and 2D show the first anchoring bracket 223A as defining two openings 293, the first anchoring bracket 223A can include any suitable number of openings configured to receive attachment mechanisms.

The open sieve 220 can include an elongated first flange 227B and an elongated second flange 227D. The first flange 227B can be coupled to the second elongated member 222B and the second flange 227D can be coupled to the fourth elongated member 222D. The first flange 227B and the second flange 227D can each be the same length and extend at an angle relative to the second elongated member 222B and the fourth elongated member 222D, respectively. The first flange 227B and the second flange 227D can be shaped, sized, and angled such that flower materials are prevented from falling in a space between the open sieve 220 and an interior wall of the combine, and are instead encouraged toward the openings 226. The first flange 227B and the second flange 227D can extend along the majority of the length of the second elongated member 222B and the fourth elongated member 222D, respectively. FIG. 2B is a cross-sectional view of the first flange 227B and the second elongated member 222B taken along line A-A in FIG. 2A. As shown, the first flange 227B can be disposed at an angle A relative to the upper surface 295B of the second elongated member 222B. The angle A can be, for example, an angle greater than 90 degrees. The angle A can be sufficiently large such that the free edge of the first flange 227B (i.e., the edge opposite the edge coupled to the second elongated member 222B) extends laterally beyond the outer periphery of the second elongated member 222B along the X-axis. In some embodiments, the angle A can be, for example, between about 100 degrees and 120 degrees. In some embodiments, the angle A can be, for example, between about 100 degrees and 115 degrees. In some embodiments, the angle A can be, for example, 110 degrees. In some embodiments, the angle A can be any suitable angle and the width of the first flange 227B can be any suitable width such that flower materials are prevented from falling between the first flange 227B and the adjacent wall of the combine in the installed configuration of the open sieve 220 (e.g., the edge of the first flange 227B can adjacent or near the wall). The second flange 227D can be the same or similar in structure and/or function to the first flange 227B, including with respect to the angle the second flange 227D is disposed relative to the third elongated member 222D. FIG. 2P is a side view of the first flange 227B. FIG. 2Q is an enlarged view of Detail B of FIG. 2O. As shown in FIG. 2Q, one or both ends of the first flange 227B can have a rounded corner opposite the edge coupled to the second elongated member 227B. In some implementations, the first flange 227B can have an overall length that is equal to or less than the length of the second elongated member 222B. For example, the first flange 227B can have an overall length that is between about 0.5 and 4 inches (e.g., about 1 inch) less than the overall length of the second elongated member 222B.

The open sieve 220 can include a first mounting bar 229B and a second mounting bar 229D. FIG. 2E shows a top view of the first mounting bar 229B. The first mounting bar 229B can be shaped as a rectangular block. The second mounting bar 229D can be the same or similar in structure and/or function to the first mounting bar 229B. Each of the first mounting bar 229B and the second mounting bar 229D can be mounted to an upper surface of the third elongated member 222C, as shown in FIG. 2A. The first mounting bar 229B and the second mounting bar 229D can be disposed adjacent to opposite ends of the third elongated member 222C. Each of the first mounting bar 229B and the second mounting bar 222D, in combination with the third elongated member 222C to which the first mounting bar 229B and the second mounting bar 222D are coupled, are shaped to have an overall thickness (e.g., in a Z-direction of FIG. 2A) that is substantially equal to or slightly smaller than a rear channel defined in an interior cavity of the combine to which the open sieve 220 is configured to be mounted such that the first mounting bar 229B and the second mounting bar 229D can be wedged into the rear channel during installation of the open sieve 220 in the rear cavity (e.g., prior to securing the open sieve 220 to the combine via screws or bolts through the openings in the first anchoring bracket 223B and the second anchoring bracket 223D.

Figure 3A:
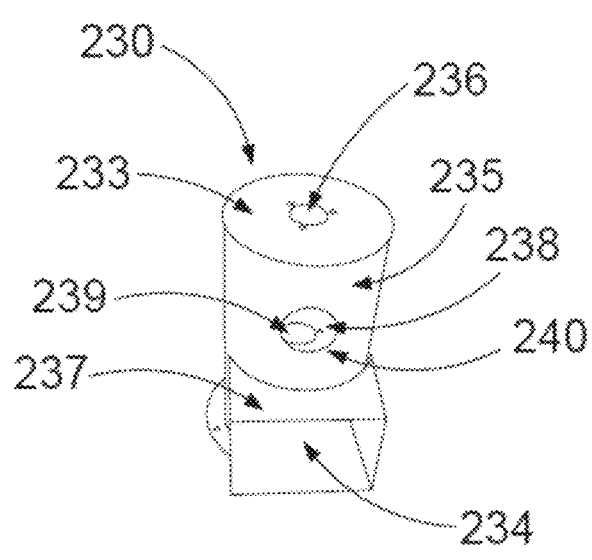
FIGS. 3A-3N are various views of an auger tip, according to an embodiment.
Figure 3B:
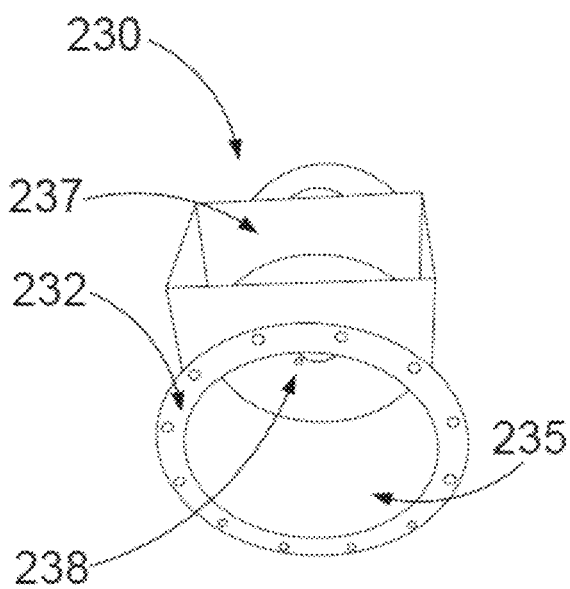
Figure 3C:
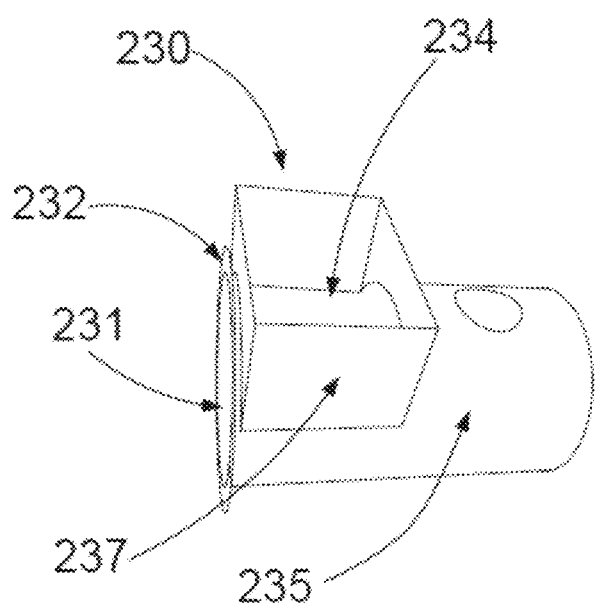
Figure 3D:
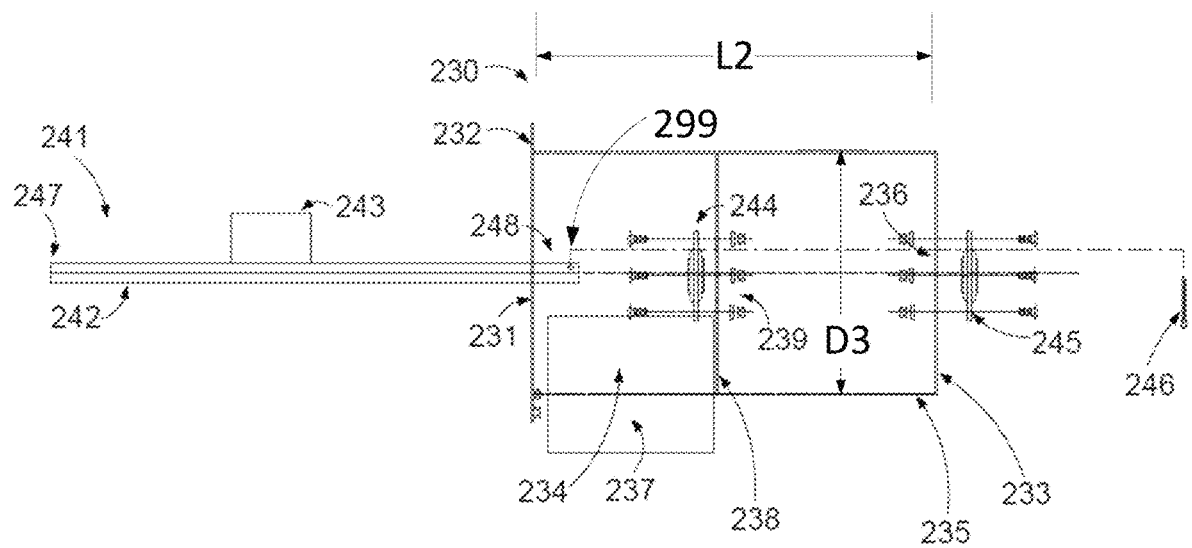
Figure 3E:
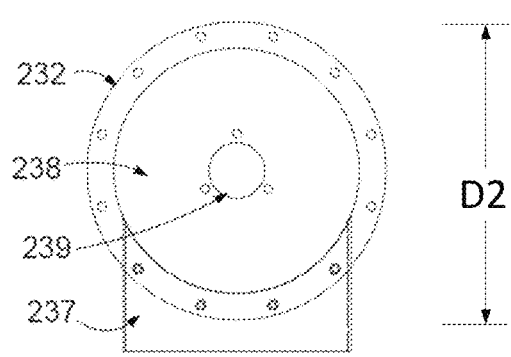
Figure 3F:
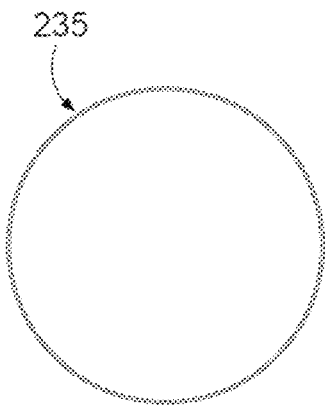
Figure 3G:
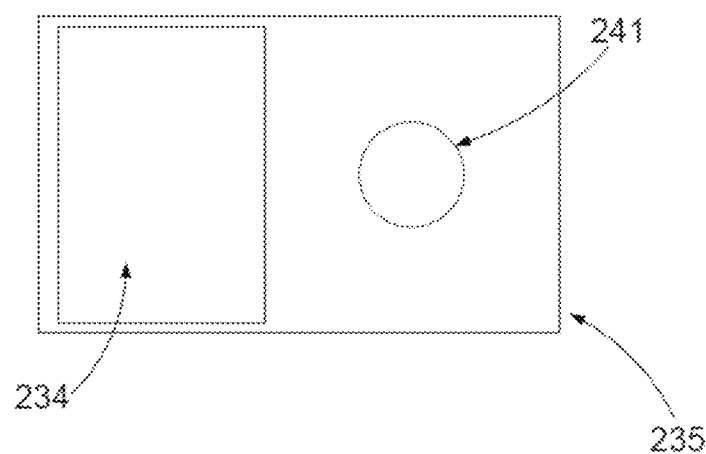
Figure 3H:
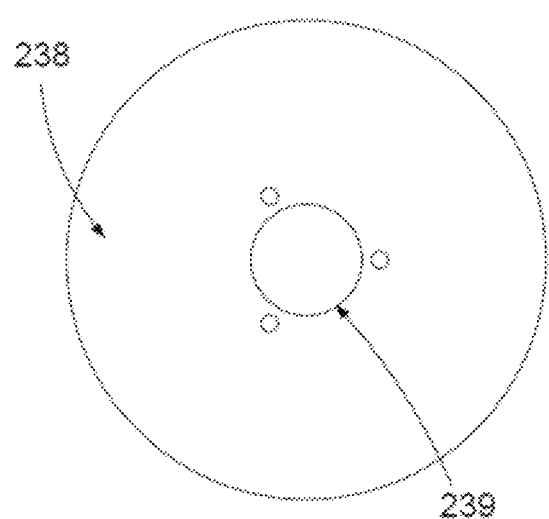
Figure 3I:
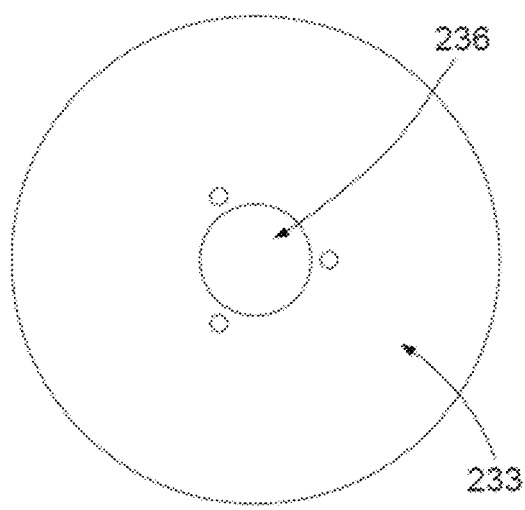
Figure 3J:
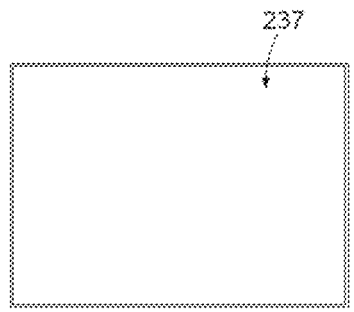
Figure 3K:
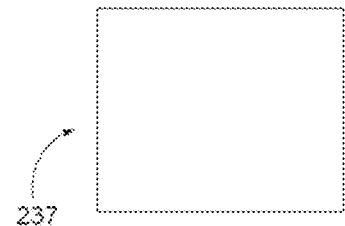
Figure 3L:
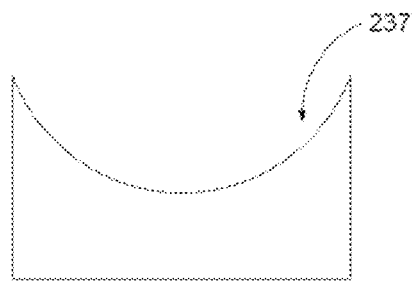
Figure 3M:
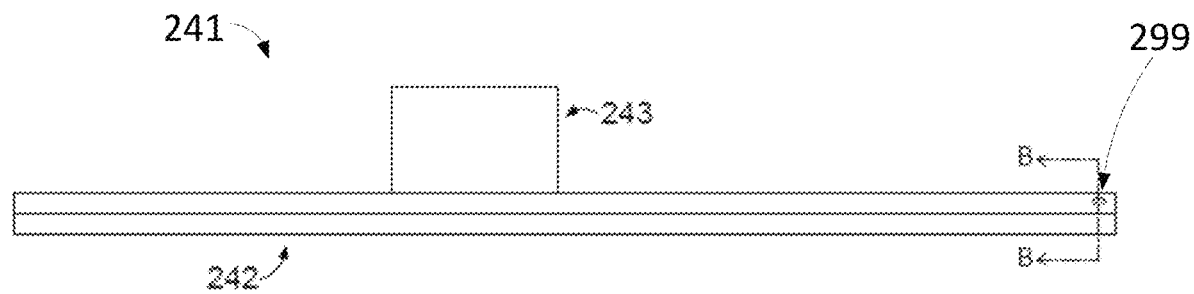
Figure 3N:
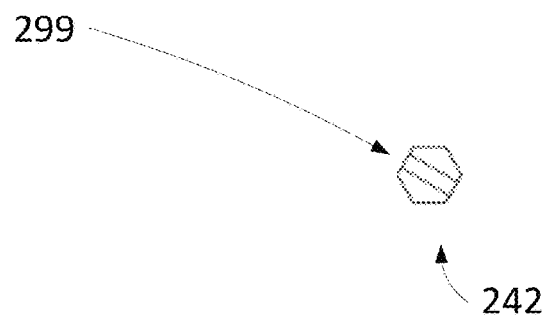

FIGS. 3A-3N are various views of an auger tip 230. The auger tip 230 can be the same or similar in structure and/or function to any of the auger tips described herein, such as the auger tip 130 described above with respect to the system 100. For example, the auger tip 230 can include a tubular portion 235 and a flange 232. FIGS. 3A-3C are various perspective views of the auger tip 230.

The tubular portion 235 has a first end 231, a second end 233, and defines an interior cavity. The first end 231 can be an open end and the second end 233 of the tubular portion 235 can be a closed end (e.g., can include an end wall). The flange 232 is coupled to the first end 231 of the tubular portion 235 and extends outward from the tubular portion 235 relative to a central axis of the tubular portion 235. The tubular portion 235 defines an opening 234 in a sidewall of the tubular portion 235. The second end 233 of the tubular portion 235 defines an opening 236 configured to receive a portion of a bearing of an auger or a shaft configured to be engaged with an auger.

The flange 232 is configured to be coupled to an auger housing such that an end portion of an auger disposed within the auger housing can be engaged with a shaft assembly 241 (shown in FIG. 3D) coupled to the tubular portion 235. For example, the flange 232 can define a number of through-holes through which fasteners (e.g., bolts or screws) can be inserted to engage the flange 232 with a flange of the auger housing. The end of the auger disposed within the auger housing can include a mating feature that corresponds to a first end 247 of a shaft 242 of the shaft assembly 241. For example, the end of the auger can include a recess having a complementary shape to the first end of the shaft 242 (e.g., hexagonal) such that the recess can receive and rotatably engage with the first end 247 of the shaft 242. Thus, the auger can rotate to convey flower material from a grain bin of a combine harvester, through the auger housing, through the first end 231 of the auger tip 230, into the interior cavity of the auger tip 230. The flower material can then fall through the opening 234 (e.g., into a chute coupled to the opening 234 and/or into a container of a truck). Additionally, when the flange 232 is coupled to the auger housing and the shaft 242 is engaged with the auger, the shaft 242 and auger tip 230 can support a portion of the weight of the auger.

The auger tip 230 includes an outlet housing portion 237 that extends from the tubular portion 235 and forms an outlet passage including and/or extending from the opening 236. The outlet housing portion can have a rectangular cross-section. A central axis of the outlet housing portion 237 can be perpendicular to a central axis of the tubular portion 235.

The auger tip 230 includes an inner wall 238 disposed between the opening 234 and the second end 233 of the tubular portion 235. The inner wall 238 defines an opening 239 that is coaxial with the opening 236 in the second end 233 of the tubular portion 235. The inner wall 238 can be parallel to the end wall of the second end 233. The inner wall 238 and the wall of the second end 233 can be configured to support a portion of an auger or a shaft engaged with an end of an auger and/or a bearing disposed within the opening 239 and the opening 236. In some implementations, the inner wall 238 can be coplanar and/or monolithically formed with a wall forming a portion of the outlet housing portion 237.

The tubular portion 235 of the auger tip 230 can also define an opening 240 in a sidewall of the tubular portion 235 disposed between the inner wall 238 and the second end 233. The opening 240 can be configured such that a user can access an interior space defined between the inner wall 238 and the second wall 233 via the opening 240 (e.g., to install or perform a repair on the portion of an auger or bearing disposed in the interior space).

In some implementations, the auger tip 230 can be shaped sized such that an inner diameter and/or an outer diameter of the tubular portion 235 is substantially similar to the inner diameter or outer diameter, respectively, of a pre-existing auger housing of a combine harvester. For example, the tubular portion 235 can have substantially the same inner diameter and/or outer diameter as an original auger housing included in any of the series 80 to 88 Case International Harvester (IH) combine machines and/or the 1400-2500 Series Case IH Axial-Flow Combines. The length of the auger tip 230 can be shorter than a length of the original auger housing. Thus, the auger tip 230 can be configured to replace an auger housing (or a portion of an auger housing) of a combine harvester and support an end or bearing of an auger disposed within a remaining auger housing (or remaining portion of the auger housing) such that, during operation of the combine harvester, material be conveyed to the auger tip 230 from a grain bin of the combine harvester and can fall through the opening 234 for collection in an external container (e.g., a truck bed).

In some implementations, the auger tip 230 can have any suitable dimensions. For example, the auger tip 230 can have an overall length L2 of, for example, between about 15 and 25 inches, between about 19 and 21 inches, about 20 inches, or about 19.833 inches. In some embodiments, the length L2 can be less than 4 feet, less than 3 feet, or less than 2 feet. The flange 232 can have an outer diameter D2 of, for example, between about 13 inches and about 15 inches, or about 14 inches. The auger tip 230 can have an inner diameter D3 of, for example, about 12 inches or about 12.125 inches. The inner wall 238 can be spaced a distance of between about 7 inches to about 11 inches or about 9 inches from the first end 232 of the tubular portion 235.

FIG. 3D is a schematic illustration of a side view of the auger tip 230 and the shaft assembly 241 in an exploded configuration. FIG. 3E shows an end view of the auger tip 230. FIGS. 3F and 3G are an end view and a side view, respectively, of the tubular member 235. FIGS. 3H and 3I are an end view of the inner wall 238 and an end view of the second end wall 233, respectively. FIGS. 3J, 3K, and 3L are a bottom view, a side view, and end view, respectively, of the outlet housing portion 237.

The shaft assembly 241 can be the same or similar in structure and/or function to the shaft assembly 141 described above with reference to FIG. 1A. The shaft assembly 241 can include a hex shaft 242, a first hex bearing 244, and a second hex bearing 245. The hex shaft 242 can have a first end 247 and a second end 248. The first hex bearing 244 can be configured to be disposed within the opening 239 of the inner wall 238 such that the first hex bearing 244 is mounted to the inner wall 238. The second hex bearing 244 can be configured to be disposed within the opening 236 of the second end wall 233 such that the second hex bearing 244 is mounted to the second end wall 233. The first hex bearing 244 and the second hex bearing 245 can each be configured to receive a portion of the hex shaft 242 such that rotation of the hex shaft causes corresponding rotation of a portion of each of the first hex bearing 244 and the second hex bearing 245. The shaft assembly 241 can include a pin 246 configured to be disposed in an opening 299 defined in the second end 248 of the hex shaft 242 to anchor the second end 248 of the hex shaft 242 relative to the second hex bearing 245 (e.g., on an outside of the auger tip 230) such that the hex shaft 242 is prevented from translating away from the second end 233. FIG. 3M is a side view of the shaft assembly 241. FIG. 3N is a cross-sectional view of the shaft 242 taken along line B-B in FIG. 3M, showing the opening 299 within which the pin 246 can be disposed. The shaft 242 can have any suitable overall length such that it extends from the second end 233 of the tubular portion 233 and mates with the auger. For example, the shaft 242 can have a length, for example, of between about 24 and 28 inches, between about 25 and 27 inches, about 26 inches, or about 26.0625 inches. The shaft 242 can be formed, for example, of 1" steel hex stock.

The shaft assembly 241 can also include an extension member 243 extending away from an outer surface of the hex shaft 242. When the shaft assembly 241 is installed within the auger tip 230, the extension member 243 can be disposed between the first end 231 of the tubular portion 235 and the inner wall 238. The first end 247 of the hex shaft 242 is configured to be coupled to an auger such that rotation of the auger causes corresponding rotation of the hex shaft 242 relative to the auger tip 230. The extension member 243 can rotate within the interior cavity of the auger tip 230 with the rotation of the hex shaft 242 such that the extension member can urge any flower material in the interior cavity toward the opening 234 and through the outlet passage defined by the outlet housing portion 237. The extension member 243 can be formed, for example, as a rectangular plate. The extension member 243 can have any suitable size. For example, the extension member 243 can be between about 3 and 5 inches long, about 4 inches long or about 3.9375 inches long. The extension member 243 can be between about 2 and 3 inches wide, or about 2.5 inches wide.

FIGS. 4A-10D include images corresponding to steps of assembling and operating a system 300. The system 300 can be the same or similar in structure and/or function to or can include any of the systems or components described herein, such as the system 100, the open sieve 220, and/or the auger tip 230. Additionally, the system 300 can be assembled and/or operated according to any of the methods described herein.

Figure 4A:
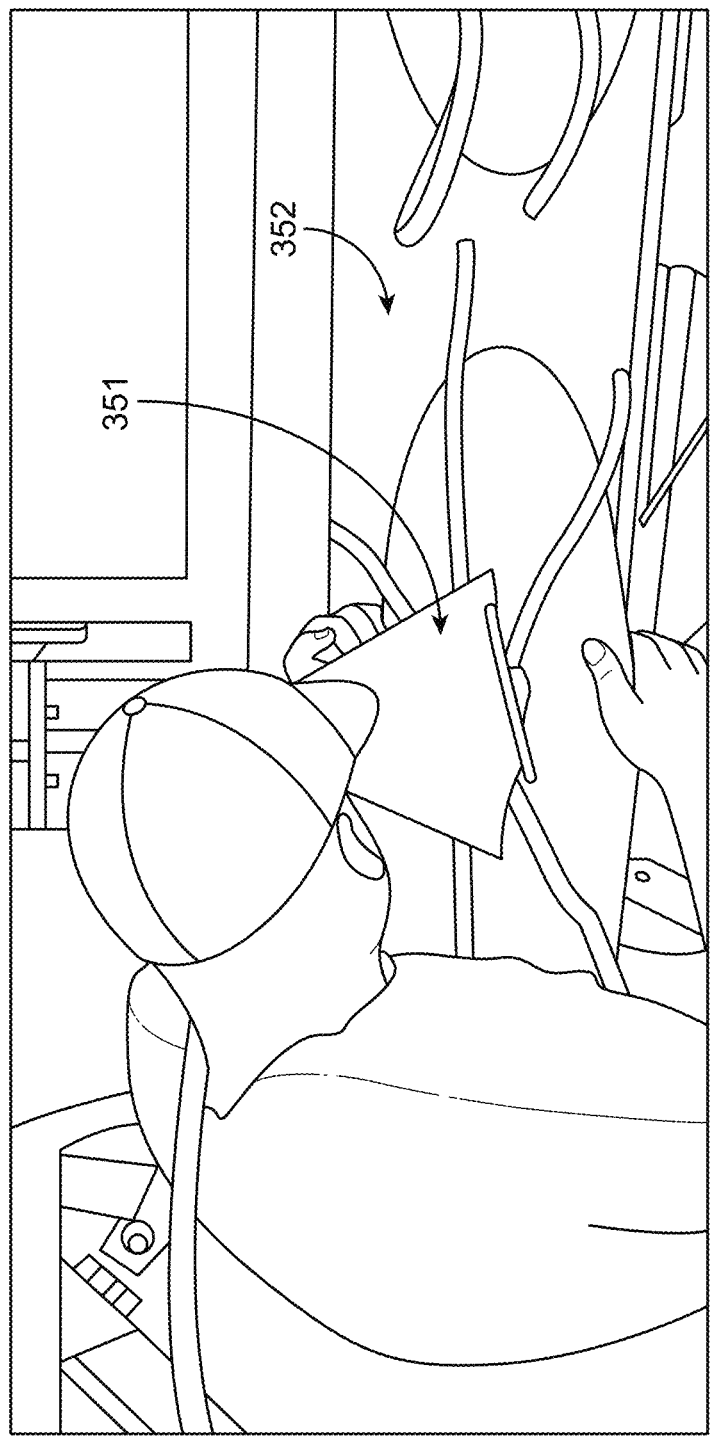
FIGS. 4A-10D are various views of a system during various phases of assembly and operation, according to an embodiment.
Figure 4B:
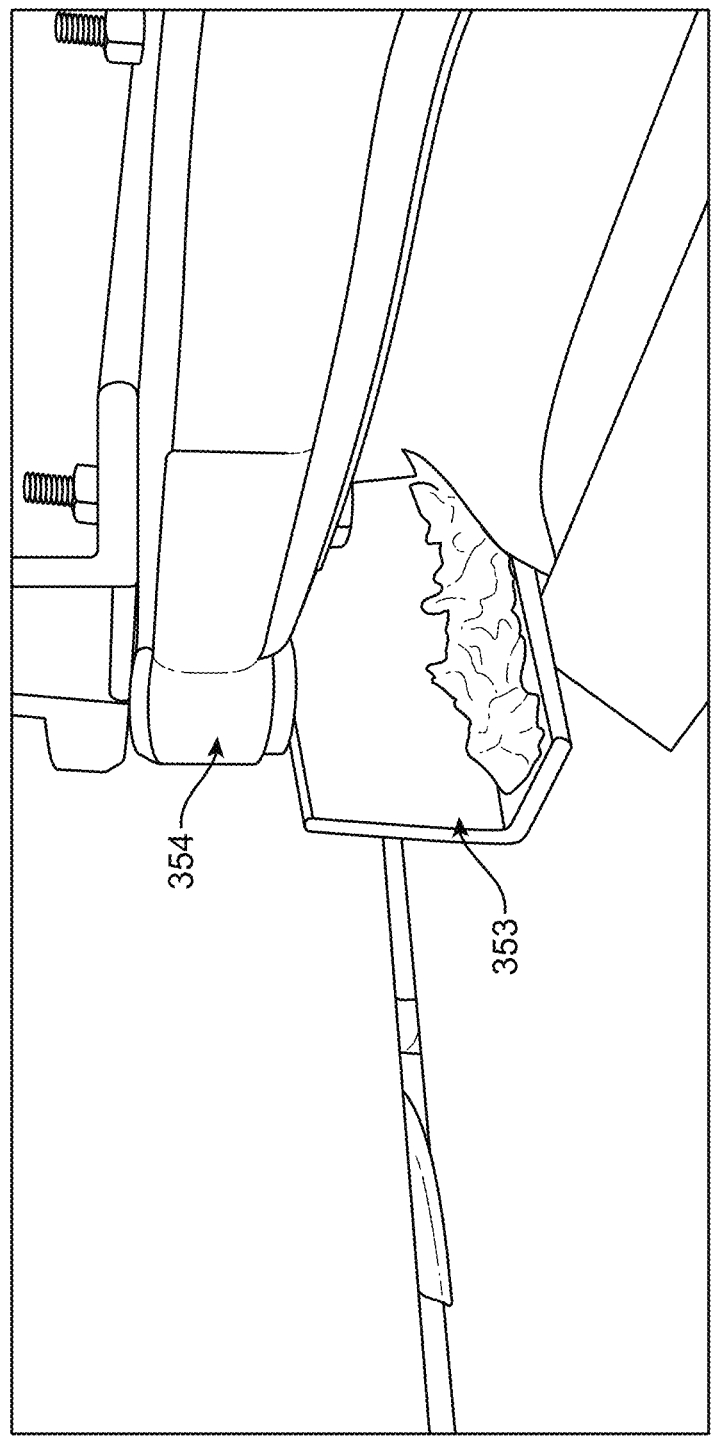
Figure 4C:
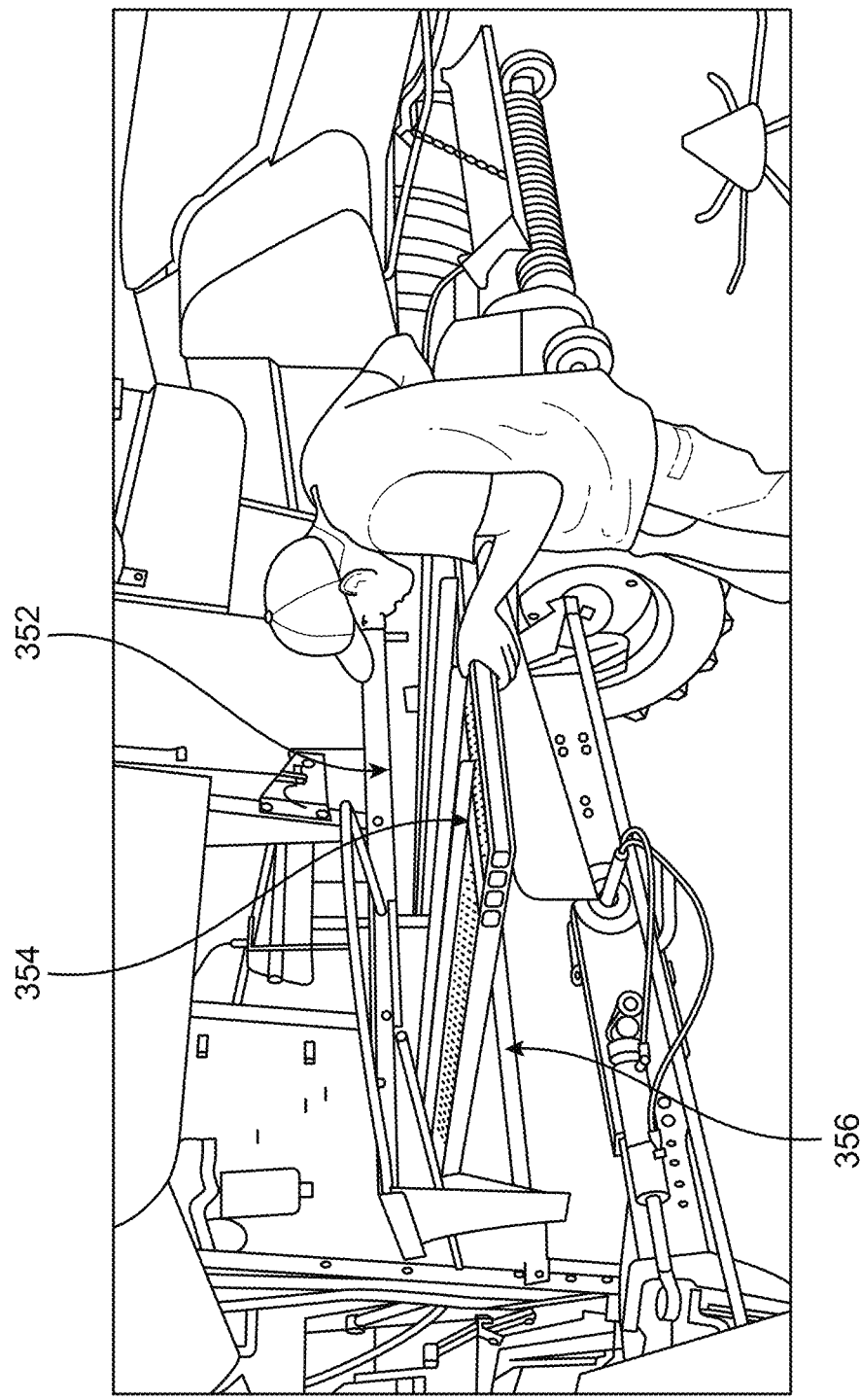

As shown in FIGS. 4A-F, a chaffer 354 and a sieve 358 can be removed from a combine harvester 350 (also referred to herein as a "combine") (e.g., from a rear internal cavity 352 of the combine 350). The chaffer 354 and the sieve 358 can each be pre-existing (e.g., stock) components of the combine harvester 350. First, as shown in FIG. 4A, bolts can be removed from each of the two spreaders 351 at the back of the combine harvester 350 and the spreaders 351 can then be removed from the combine 350. Next, a pan of the combine 350 can be removed from the cavity 352 of the combine 350. For example, the pan can have a first pin and second pin that project from a base of the pan in opposite directions. The pan can be removed by applying pressure to a first side of the pan in a first direction (e.g., away from an opposite second side) and then rotating the pan to disengage a pin extending from the opposite side of the pan from an interior wall of the combine 350. With the pan removed, bolts securing the chaffer 354 to a first rail 353, as shown in FIG. 4B. Similarly, bolts securing the chaffer 254 to a second rail 355 (shown, e.g., in FIG. 5A) of the combine 350 can be removed. The first rail 353 can extend from the back toward the front of internal cavity 352 of the combine on a first side of an internal cavity 352 and the second rail 355 can extend from the back toward the front of the internal cavity 352 of the combine 350 on a second side of the internal cavity, the first rail 353 being parallel to the second rail 355. With the bolts removed, as shown in FIG. 4C, the chaffer 354 can be pulled out of the rear internal cavity 352 of the combine 350. Any debris (e.g., rocks) engaged with the chaffer 354 can be removed.

Figure 4D:
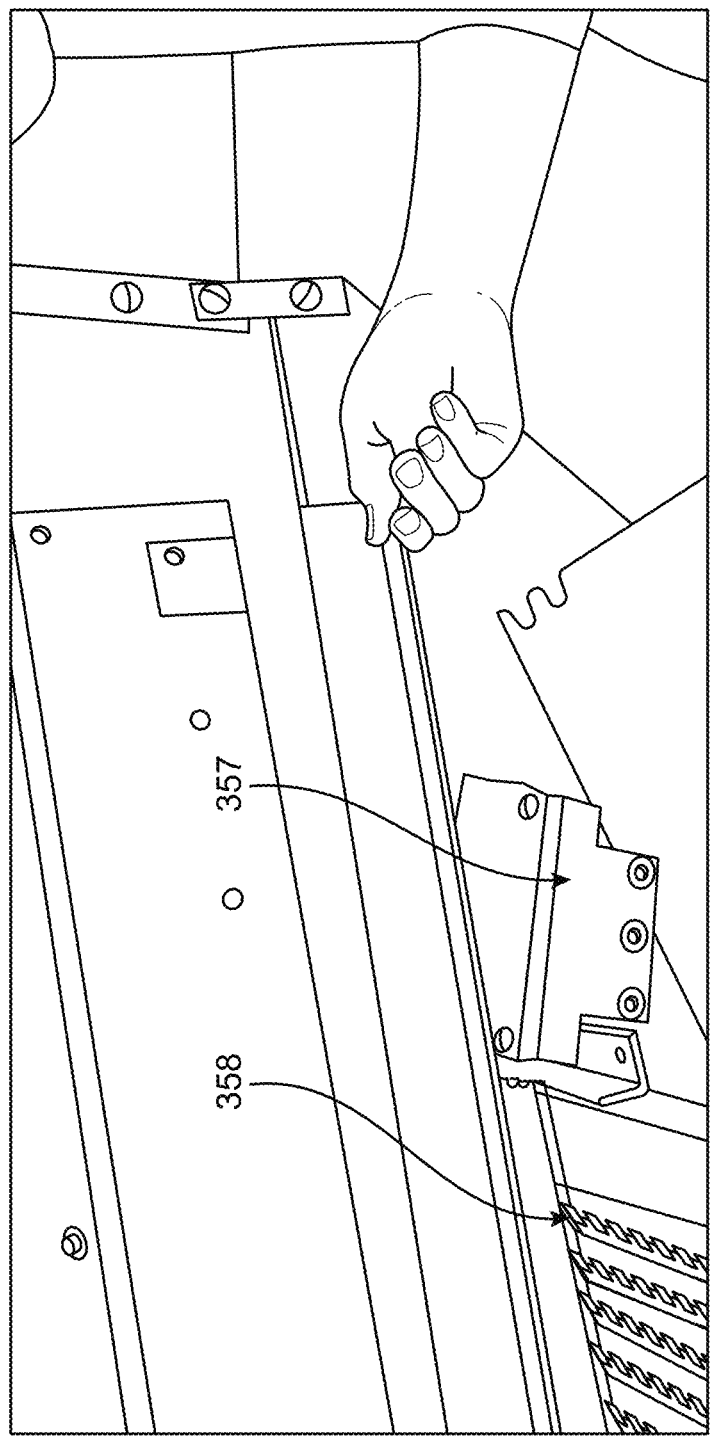
Figure 4E:
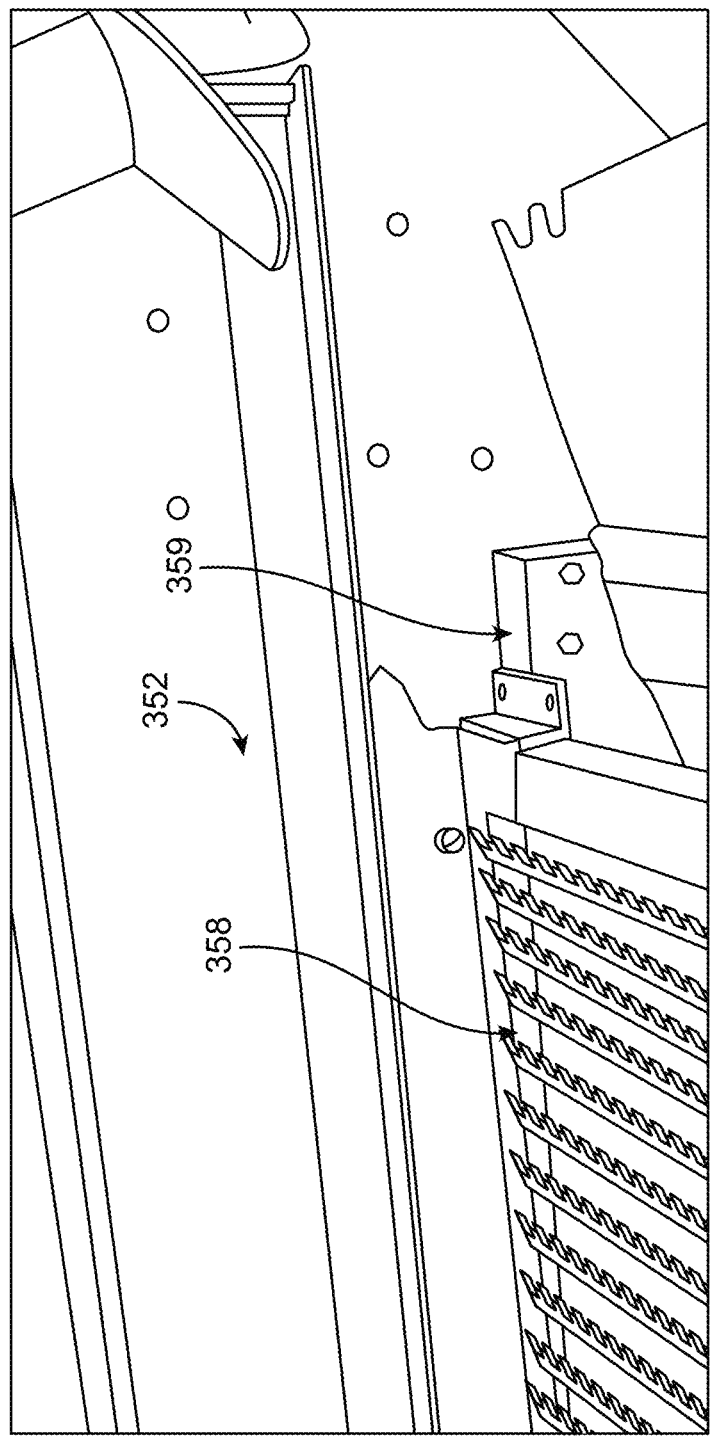
Figure 4F:
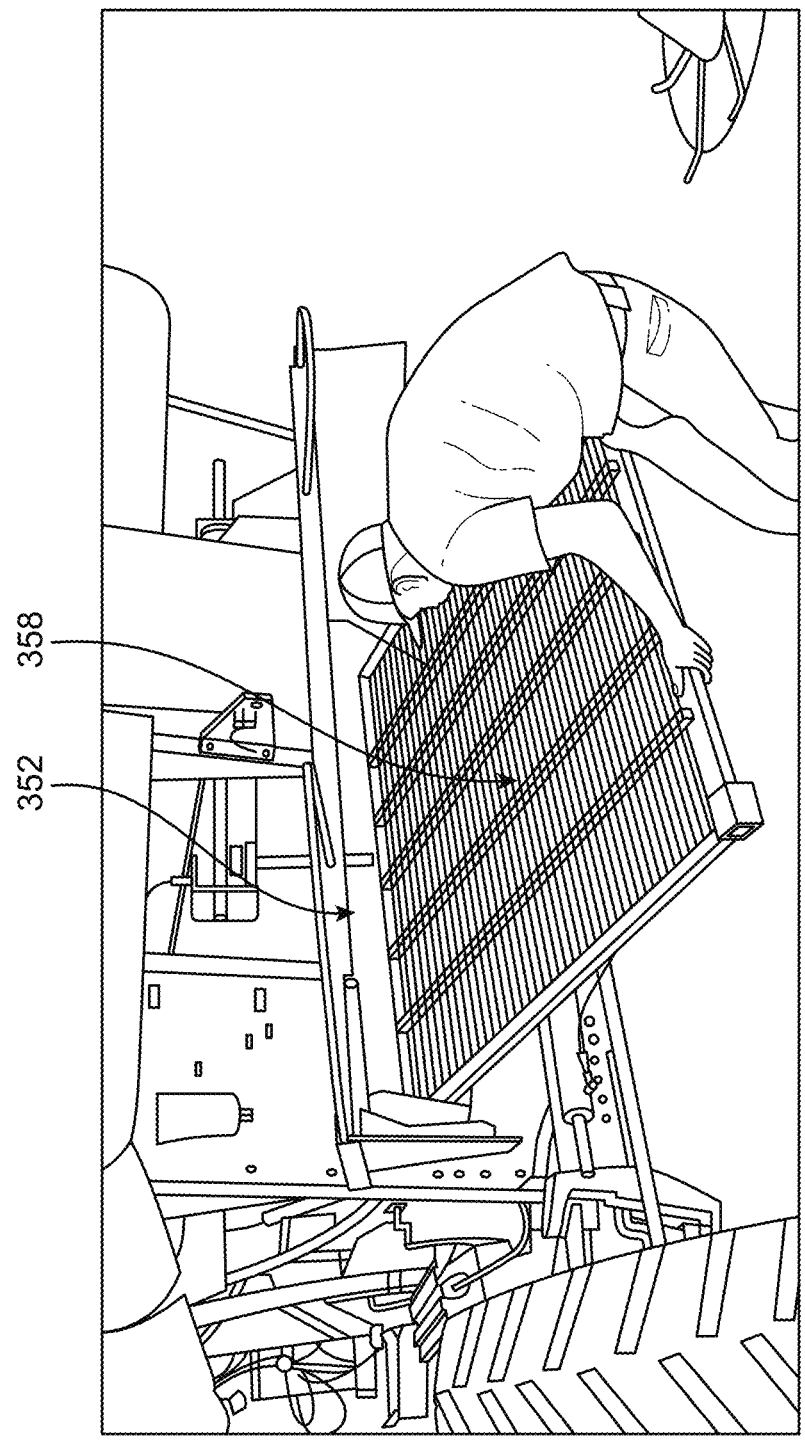

Next, a door 356 (shown in FIG. 4C) at the back of the combine 350 can be lowered. As shown in FIG. 4D, a pair of plates 357 (shown in FIG. 5D) secured on a first side (e.g., the left side) and a second side (e.g., the right side) of the internal cavity 352 of the combine 350 can be removed. As shown in FIG. 4E, bolts attaching the sieve 358 to a pan 359 can be removed (e.g., two bolts on each side, one bolt on a projecting tab of the sieve, and one on a corner of a frame of the sieve). As shown in FIG. 4F, the sieve 358 can then be pulled out of the combine 350. The combine 350 can be checked to verify no stress cracks exist along the rails (e.g., the first rail 353 and the second rail).

Figure 5A:
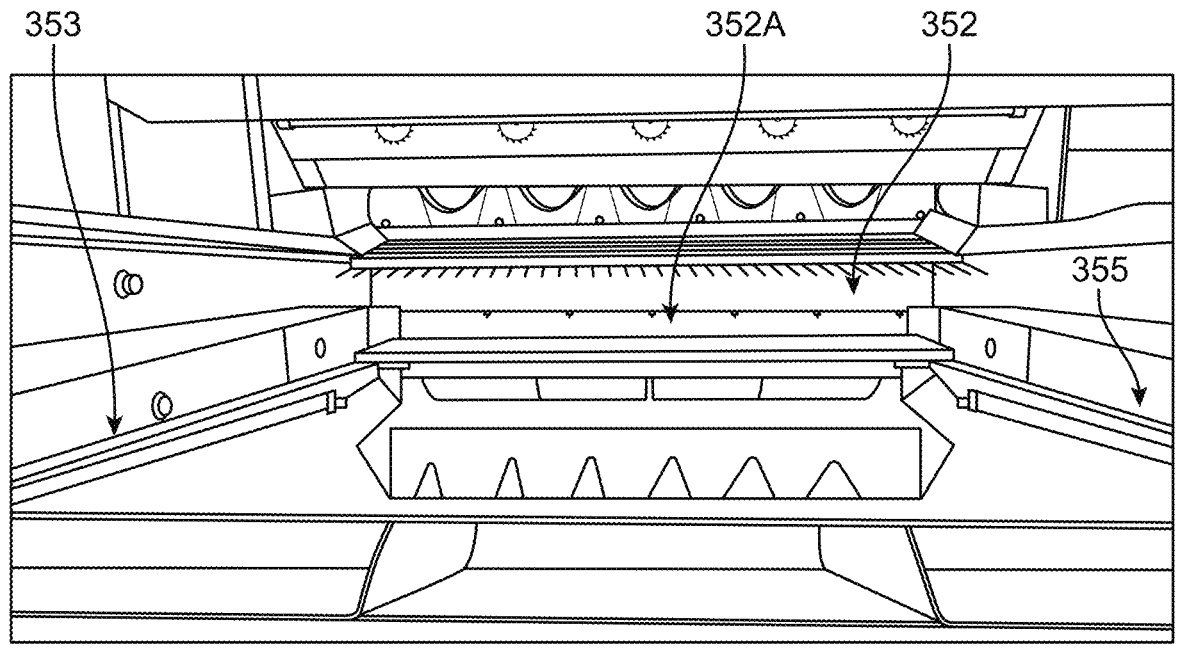
Figure 5B:
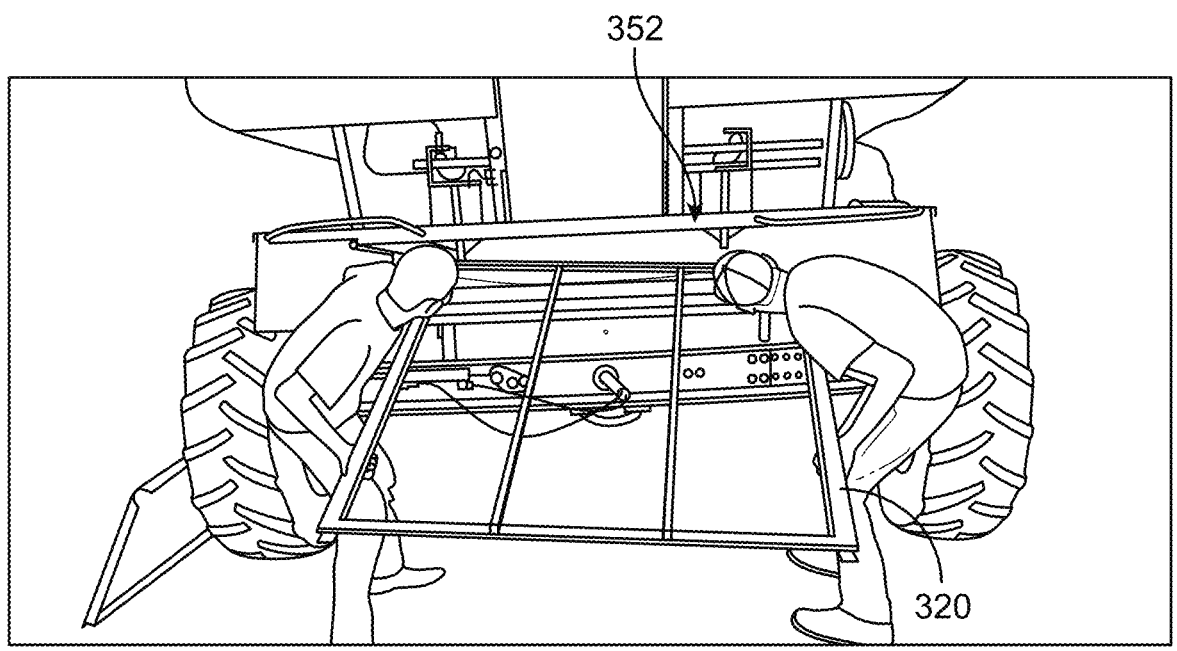
Figure 5C:
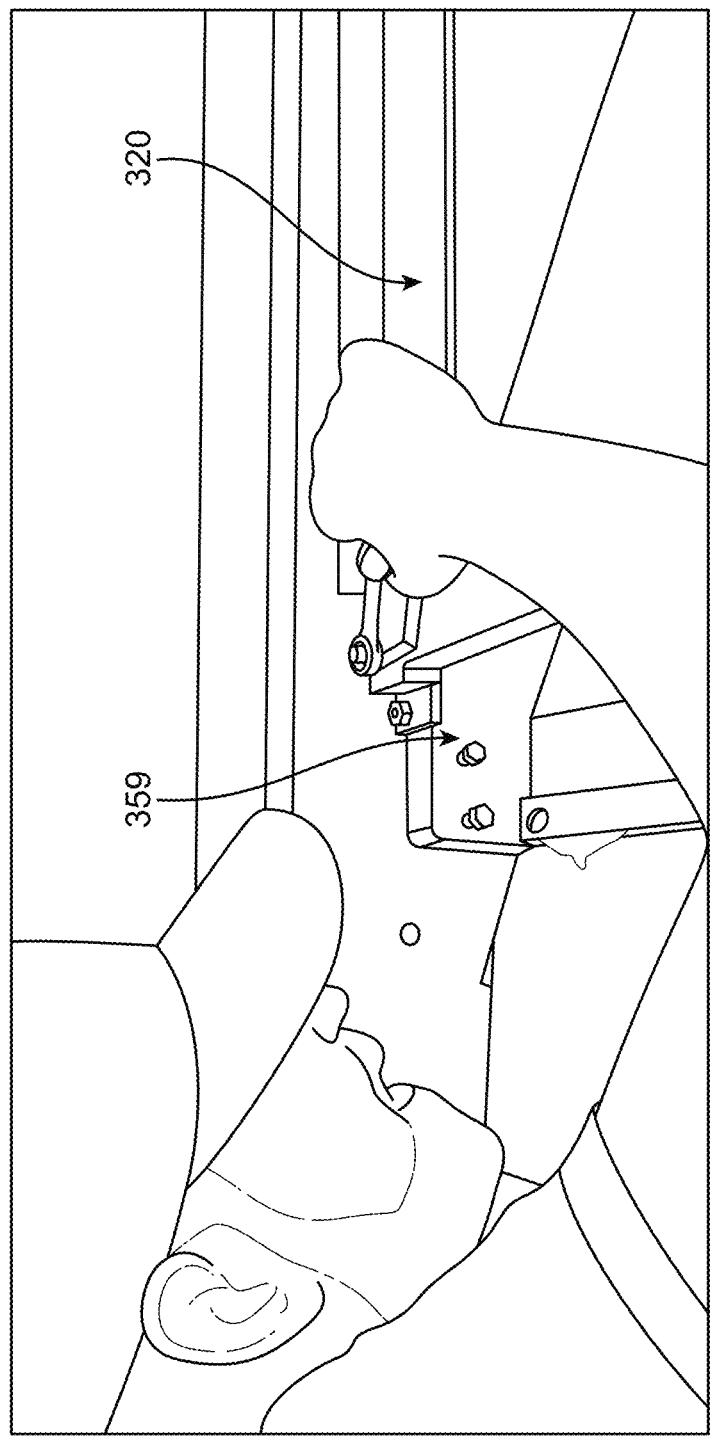
Figure 5D:
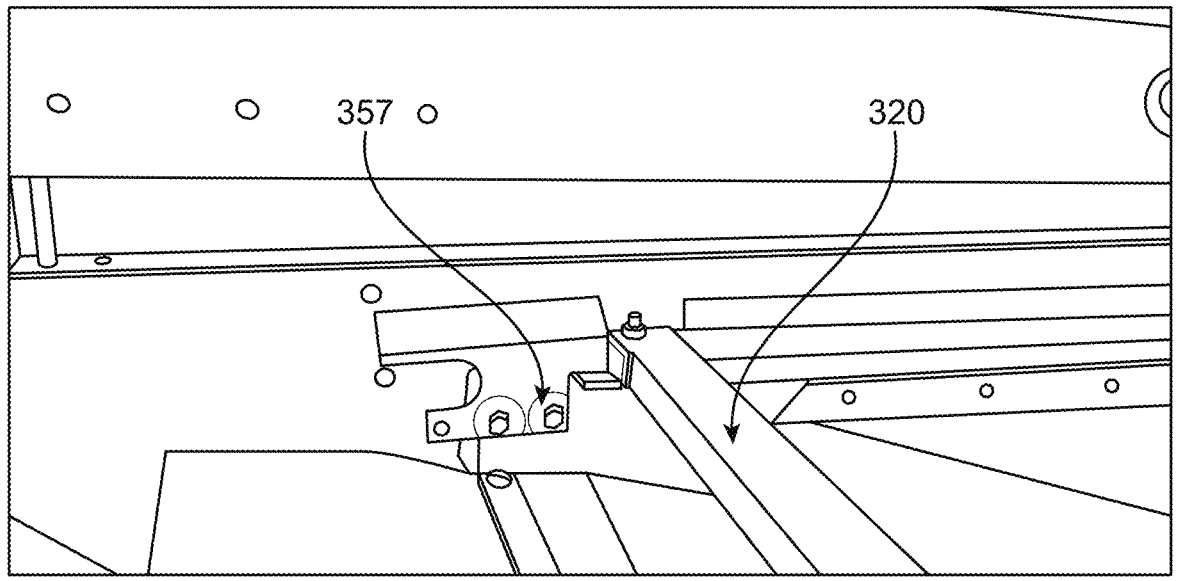
Figure 5E:
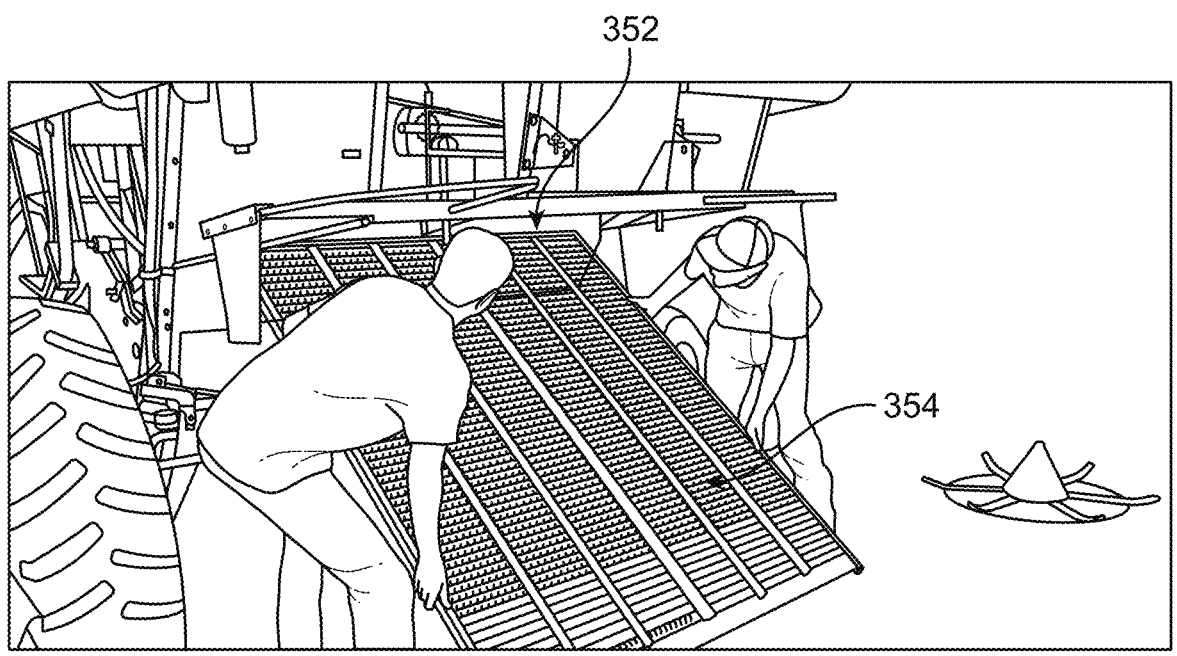

Next, as shown in FIGS. 5A-5D, an open sieve 320 can be installed in the location within the internal cavity 352 where the pre-existing sieve 358 was located (shown in FIG. 5A). The open sieve 320 can be the same or similar in structure and/or function to any of the open sieves described herein, such as the open sieve 120 and/or the open sieve 220. As shown in FIG. 5B, the open sieve 320 can be placed (e.g., via being slid) in the initial location of the pre-existing sieve 358. The open sieve 320 can be pushed toward the back of the internal cavity 352 until mounting bars (e.g., mounting bars such as first mounting bar 229B and the second mounting bar 229D) are wedged within a sieve channel 352A defined in the back wall of the internal cavity 352 and the open sieve 320 rests against the first side rail 353 and the second side rail 355. As shown in FIG. 5C, bolts can be installed to secure the open sieve 220 to the pan 359 (e.g., two on each side, one on a projecting tab of the open sieve, and one on a corner of the frame). As shown in FIG. 5D, the plates 357 can be installed on the first side and the second side. The door 356 on the back of the combine 350 can be raised. As shown in FIG. 5E, the chaffer 354 can be reinstalled in the initial location of the chaffer 354 and secured to the first rail 353 and the second rail 355 (e.g., via bolts).

Figure 6B:
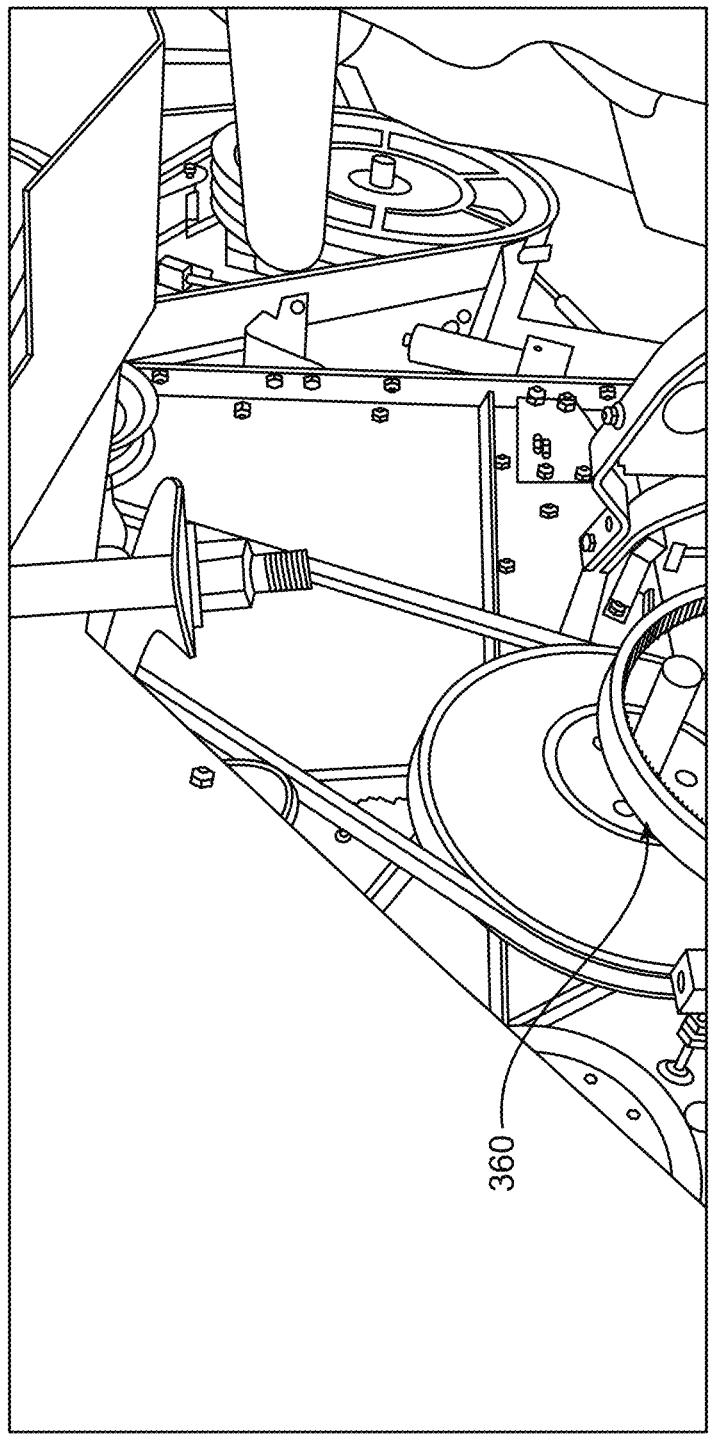
Figure 6C:
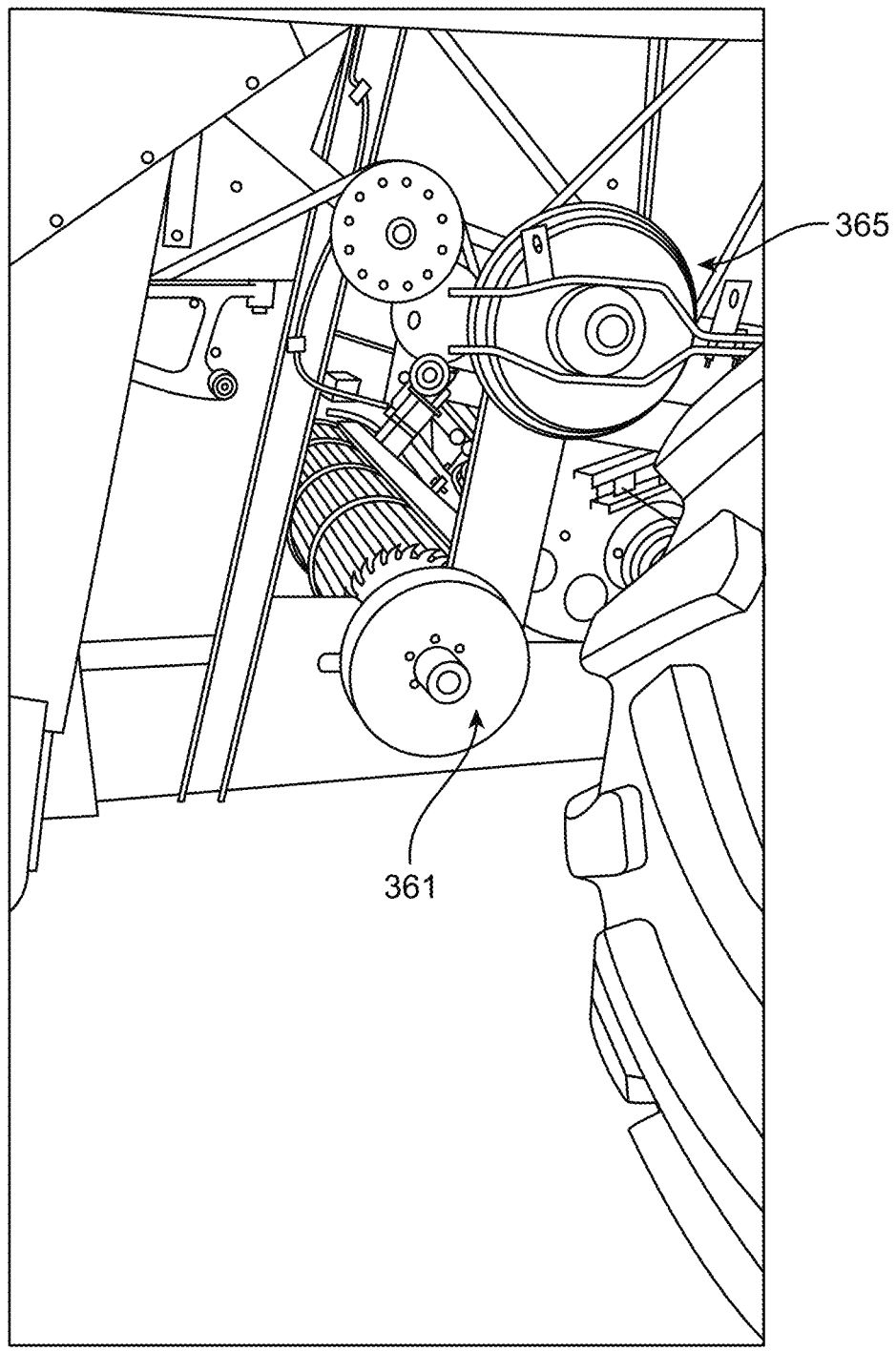

As shown in FIGS. 6A-6C, a fan belt 360 of the combine 350 can be removed to disable a fan 361 of the combine 350. First, as shown in FIG. 6A, bolts holding a swinging arm 362 in place relative to an outer plate 364 of a pulley system 365 can be removed. Then, a center bolt can be removed from the swinging arm 362. The swinging arm 362 can be opened and the outer plate 364 can be removed to free the fan belt 360 as shown in FIG. 6B. The fan belt 360 can be removed. As shown in FIG. 6C, the outer plate 364 of the pulley system 365 can be reapplied in its original location and the swinging arm 362 can be closed and resecured (e.g., via bolts). In the configuration shown in FIG. 6C, the fan 361 is no longer coupled to the pulley system 365 via the fan belt 360.

Figure 7A:
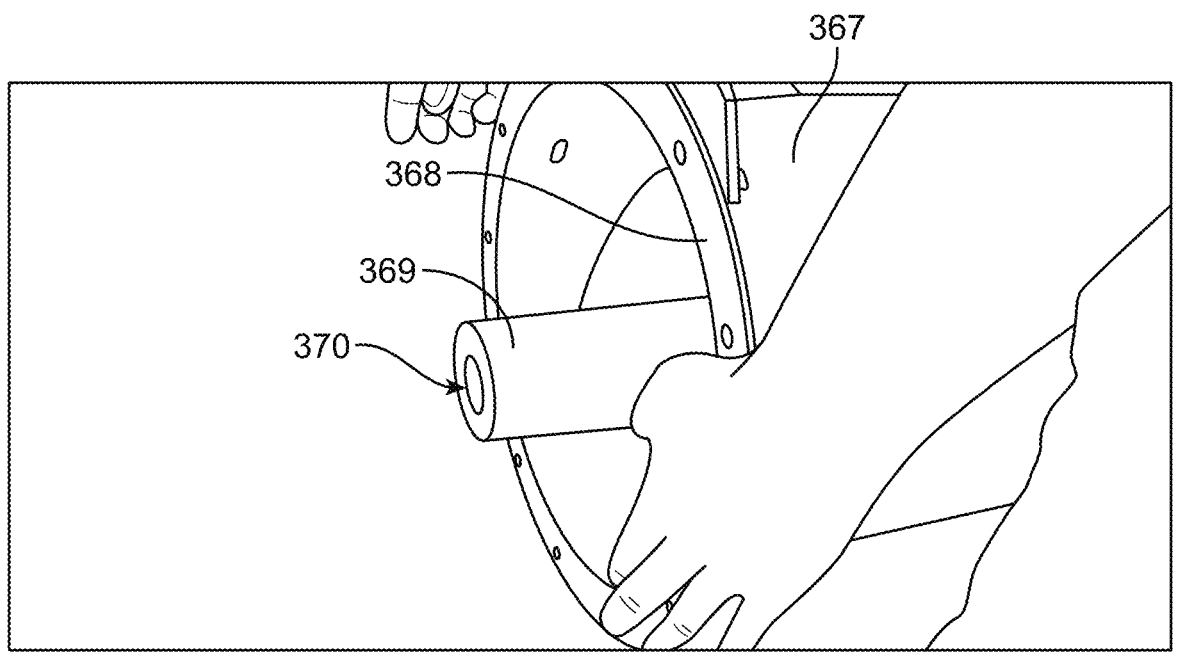
Figure 7B:
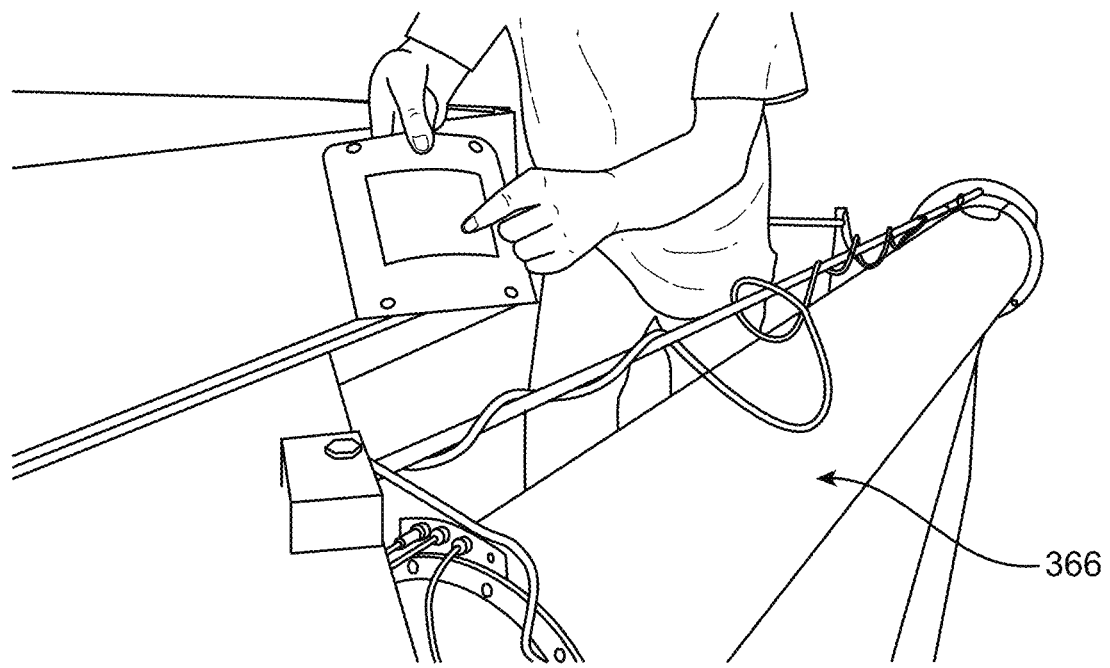

As shown in FIGS. 7A-7C, to prepare the combine 350 for installation of an auger tip 330, an auger tube 366 can be removed. The combine may include, for example, a first auger tube 367 and a second auger tube 366 or a first auger tube portion and a second auger tube portion. The second auger tube 366 or the second auger tube portion extending away from the grain bin and the first auger tube or the first auger tube portion, respectively, can be removed. For example, while supporting the second auger tube 366 near a center of the second auger tube 366, all bolts around an auger ring (also referred to as a flange) can be removed. The second auger tube 366 can be lowered off the combine 350. An octagon shaft 342 (also referred to as a hex shaft) (shown in FIG. 8A) and a brace can be removed from the second auger tube 366. If the auger 369 within the first auger tube 367 has been translated relative to the first auger tube 367, the auger 369 can be pushed back into the first auger tube 367 and set back in timing as shown, for example, in FIG. 7C (e.g., following instructions for setting timing in combine owner's manual). As shown in FIG. 7A, the auger 369 can define an opening 370 configured to receive an end of the octagon shaft 342.

Figure 8B:
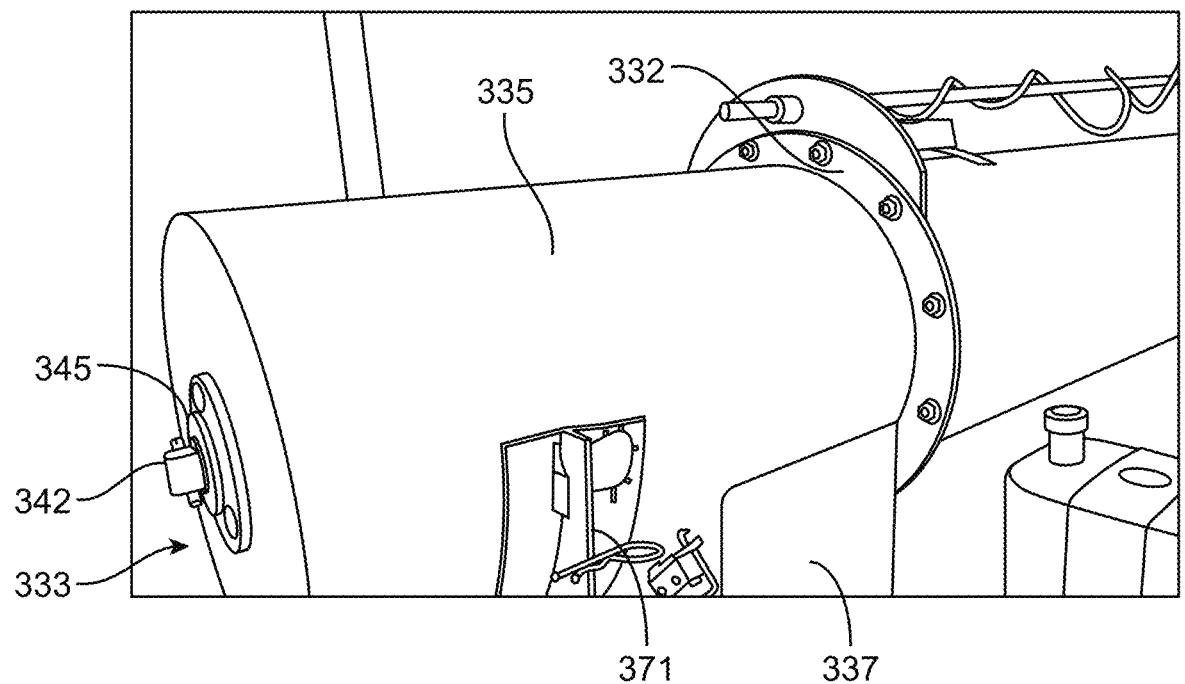
Figure 8C:
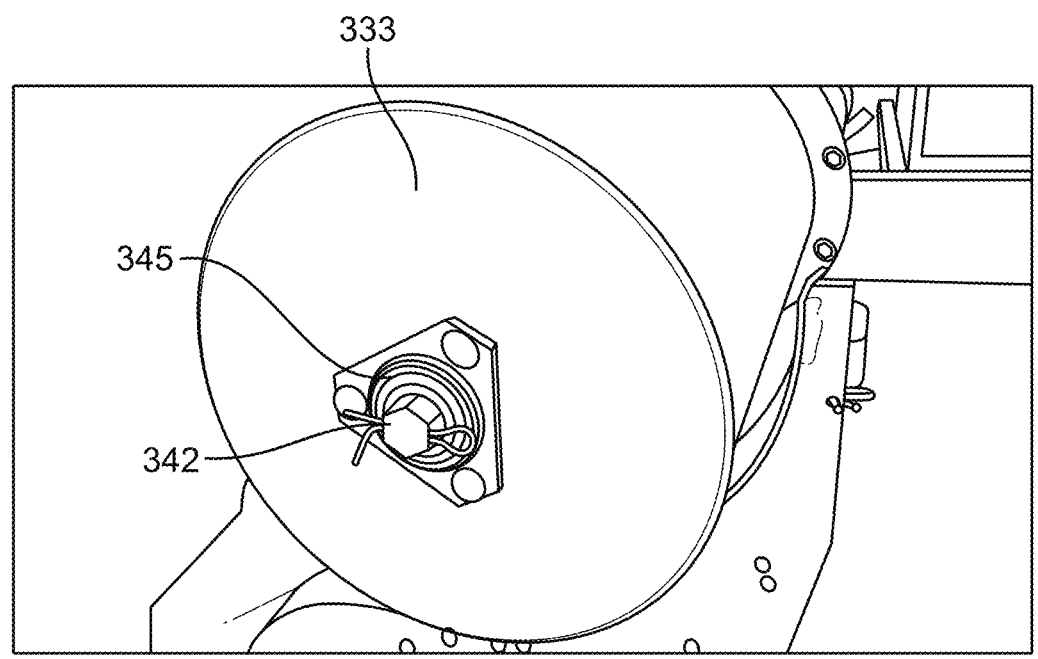
Figure 8D:
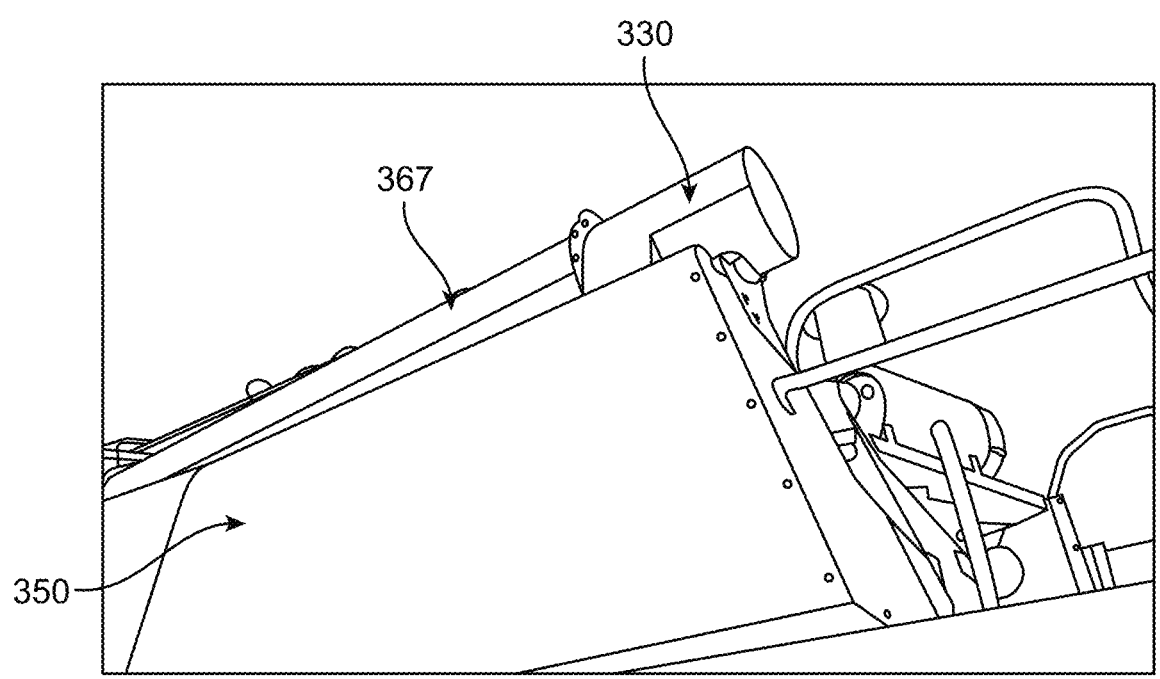

As shown in FIGS. 8A-8D, the auger tip 330 can be installed. The auger tip 330 can be the same or similar in structure and/or function to any of the auger tips described herein, such as, for example, the auger tip 130 and/or the auger tip 230. For example, the auger tip 330 includes a tubular portion 335, a second end wall 333, and an outlet housing portion 337, and a second hex bearing 345 is mounted to the second end wall 333. As shown in FIG. 8A, the octagon shaft 342 can be disposed within the auger tip 330 such that the octagon shaft 342 projects through an inner wall opening and a second end opening of the auger tip 330. A flange 332 of the auger tip 330 can be aligned with a flange 368 of the first auger tube 367 and an end of the octagon shaft 342 can be received within the opening 370 of the auger 369 and the auger tip 330 can be secured to the first auger tube (e.g., via disposing bolts through openings in the flange 332 of the auger tip 330 and coaxially aligned openings in a flange 368 of the first auger tube 367). An auger saddle 371 of the combine 350 can be adjusted upward and secured via bolts (e.g., four bolts). An auger switch can also be adjusted, if necessary.

Figure 9A:
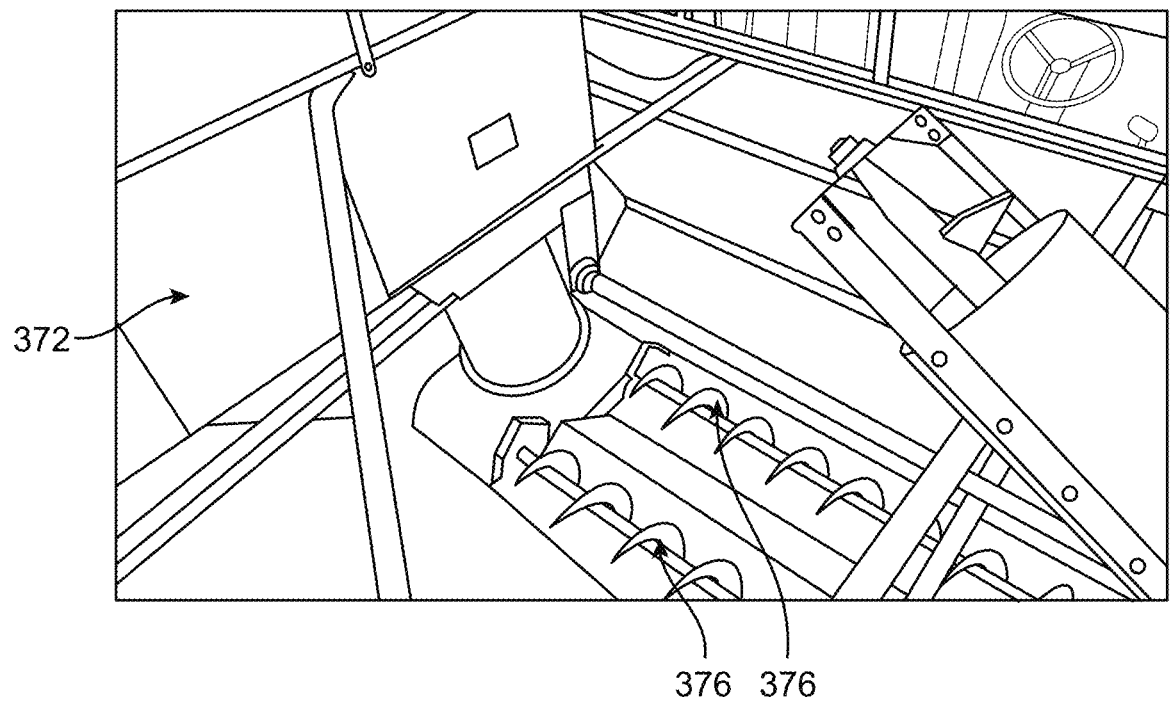

As shown in FIG. 9A, the grain bin 372 of the combine 350 can be modified to receive and move flower material. FIG. 9A shows the grain bin 372 after the modification. For example, cross-supports and steps can be removed from the grain bin 372. Auger hoods that run along the grain bin 372 can be removed and the augers 376 exposed (e.g., such that the augers 376 can urge flower material disposed in the grain bin 372 toward an end of an auger configured to carry the flower material out of the bin to the auger tip 330). For example, bolts at each end of the auger hoods can be removed such that the auger hoods 375 can be removed.

Figure 9B:
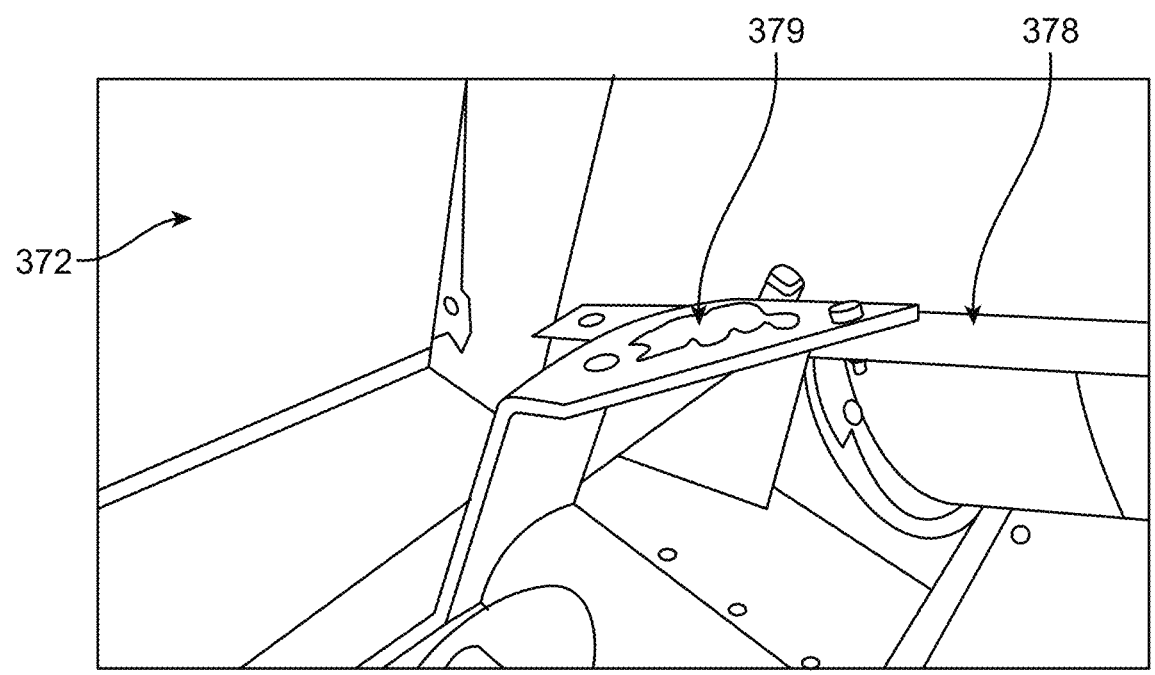
Figure 9C:
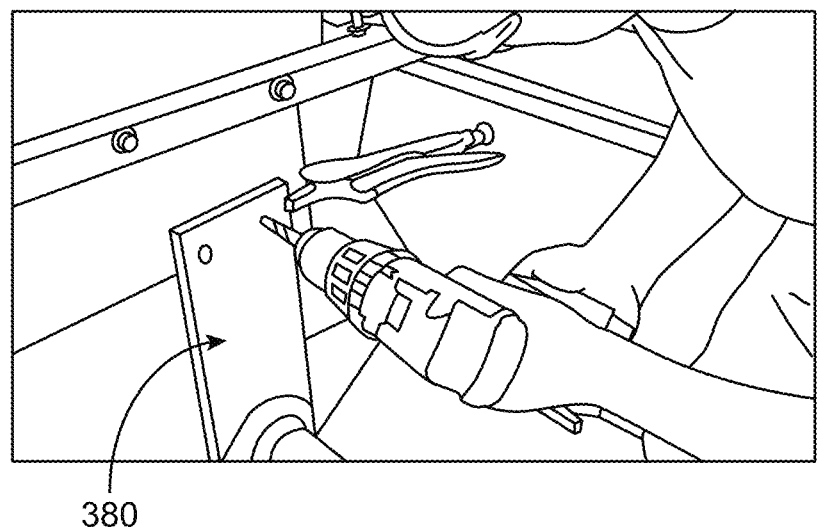
Figure 9D:
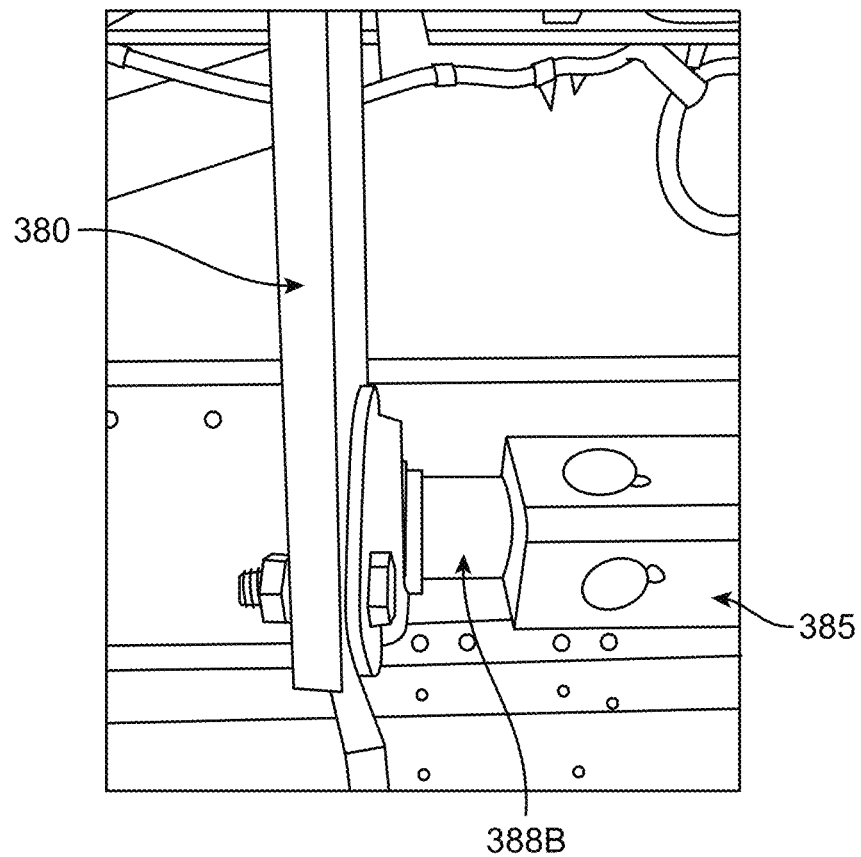
Figure 9E:
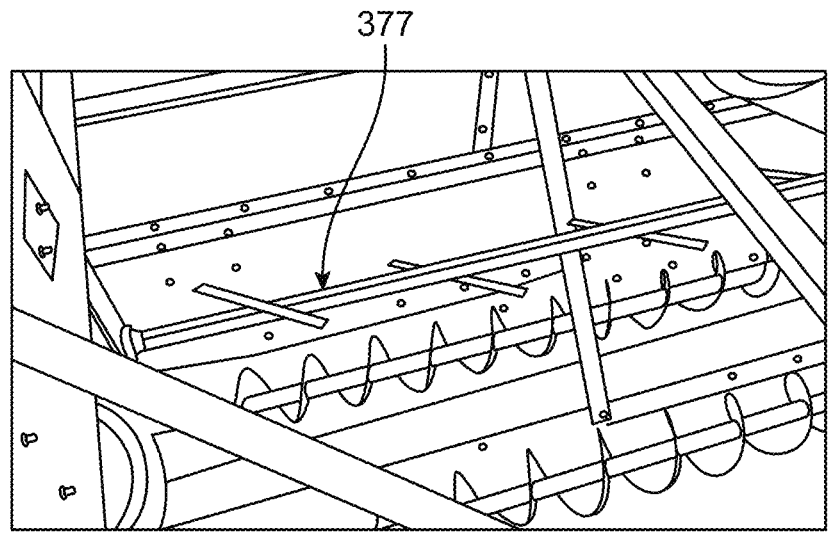
Figure 9F:
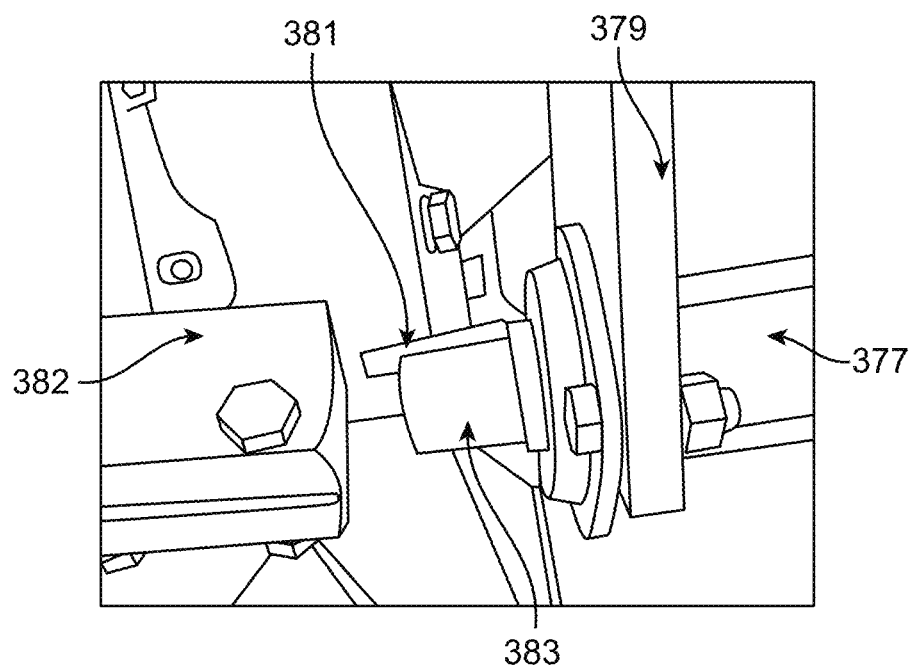
Figure 9G:
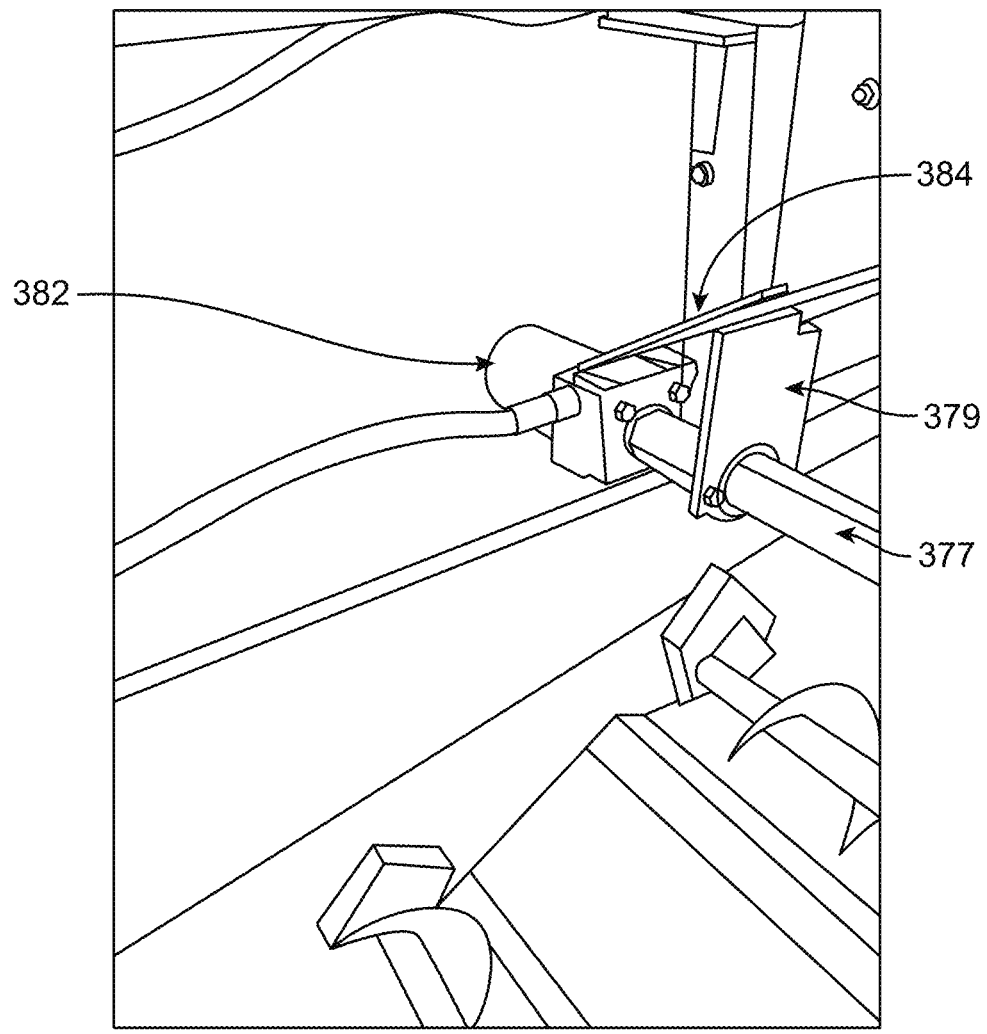

As shown in FIGS. 9B-9G, a bin agitator 377 can be installed in the grain bin 372. For example, bolts can be removed from a bottom side of an auger tube seam 378 on a first side of the grain bin 372. As shown in FIG. 9B, an L-shaped bracket 379 can be attached to the auger tube seam 378. Optionally, the original bolt holes can be reamed out to create sufficient room for the L-shaped bracket 379. As shown in FIGS. 9C and 9D, on a second side of the grain bin 372 opposite the first side, a flat bracket 380 can be attached to a wall of the grain bin 372. The flat bracket 380 can be clamped about one inch from the front of an auger tube support and about 4 and ⅛ inches below an angle iron cross support. Two holes can be drilled in the flat bracket 380. As shown in FIG. 9E, the bin agitator 377 can then be disposed within the grain bin 372 with a round shaft portion of the bin agitator 377 coupled to the L-shaped bracket 379. The bin agitator 377 can include a central elongated member 385 and a plurality of secondary elongated members (e.g., bar segments) coupled to the central elongated member 385 and extending at an angle relative to a central axis of the central elongated member. As shown in FIG. 9D, the bin agitator 377 can include a second tubular member 388B coupled to the central elongated member 385 that is the same or similar in structure and/or function to the second tubular member 188B described above with respect to FIGS. 1D and 1E. As shown in FIG. 9F, a key 381 can be coupled to an end of the bin agitator 377 such that the key 381 extends away from the L-shaped bracket 379 in a direction away from the flat bracket 380. As shown in FIGS. 9F and 9G, a hydraulic motor 382 can be disposed over a shaft portion 383 extending from the bin agitator 377. The shaft portion 383 can be the same or similar in structure and/or function to the first tubular member 188A described above with respect to FIGS. 1D and 1E, or can be included in a first tubular member (e.g., first tubular member 188A). Two bolts can be secured on a collar 384 securing the motor 382 to the shaft portion 383. The hydraulic motor 382 can be attached to the L-shaped bracket 379 via the collar 384.

A first end of each of a first and a second hydraulic hose can be coupled to the hydraulic motor such that the bin agitator 377 can be controlled by controls in a cab of the combine 350. Each of the hydraulic hoses can be run out of the grain bin 372 and to the combine's hydraulic interface. Previously-installed fore and aft hoses can be uncoupled from the hydraulic interface. At least one of the first and the second hydraulic hoses can be coupled to the hydraulic interface. Any excess slack in the first and the second hydraulic hoses can be secured. Controls in the cab configured to control the "fore" and "aft" ports of the hydraulic interface can be used to rotate the bin agitator 377 forward and backward.

Figure 9H:
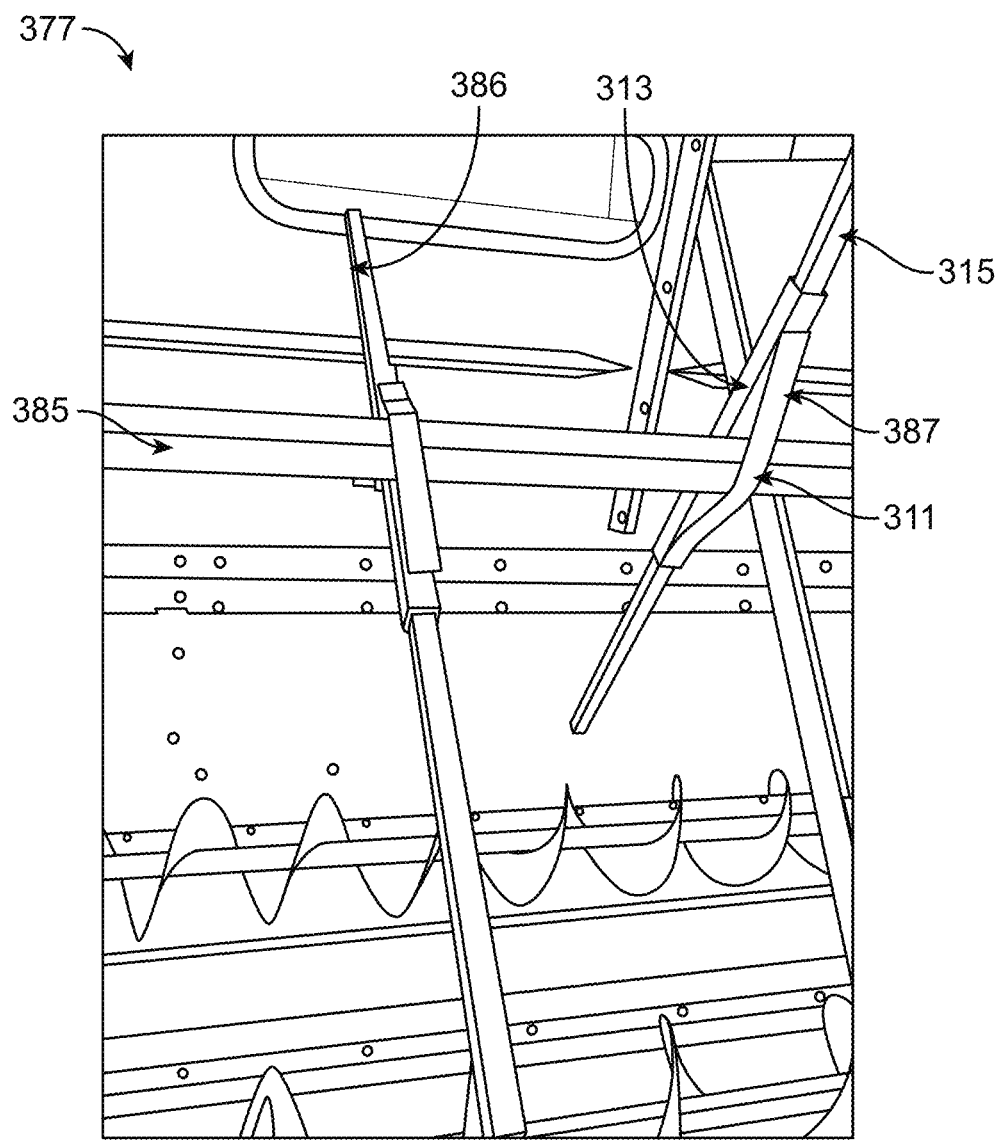

FIG. 9H shows a bin agitator 377A having an alternative shape to the bin agitator 377. The bin agitator 377A can have the same or similar structure and/or function as any of the bin agitators described herein, such as the bin agitator 177 and the bin agitator 377. As shown in FIG. 9H, the bin agitator 377A includes an elongated member 386, a first bar segment 386, and a second bar segment 387. The first bar segment 386 and the second bar segment 387 can extend from the elongated member 386 perpendicularly relative to each other. The first bar segment 386 can be coupled to a first side of the elongated member 386 and the second bar segment 387 can be coupled to a second side of the elongated member 387, the second side being perpendicular to the first side. As shown, the second bar segment 387 can be mounted to the elongated member 385 via welding and/or a bracket 311 that is disposed over an opposite side of the elongated member 385 than the second bar segment 387 is coupled to. The second bar segment 387 can include a short tubing section 313 coupled to the elongated member 385 (e.g., via welding and/or the bracket 311) and a longer tubing section or longer rod 315 disposed within a lumen of the short tubing section 315 and secured to the short tubing section 313. The first bar segment 387 can be the same or similar in structure and/or function to the second bar segment 385.

Figure 10A:
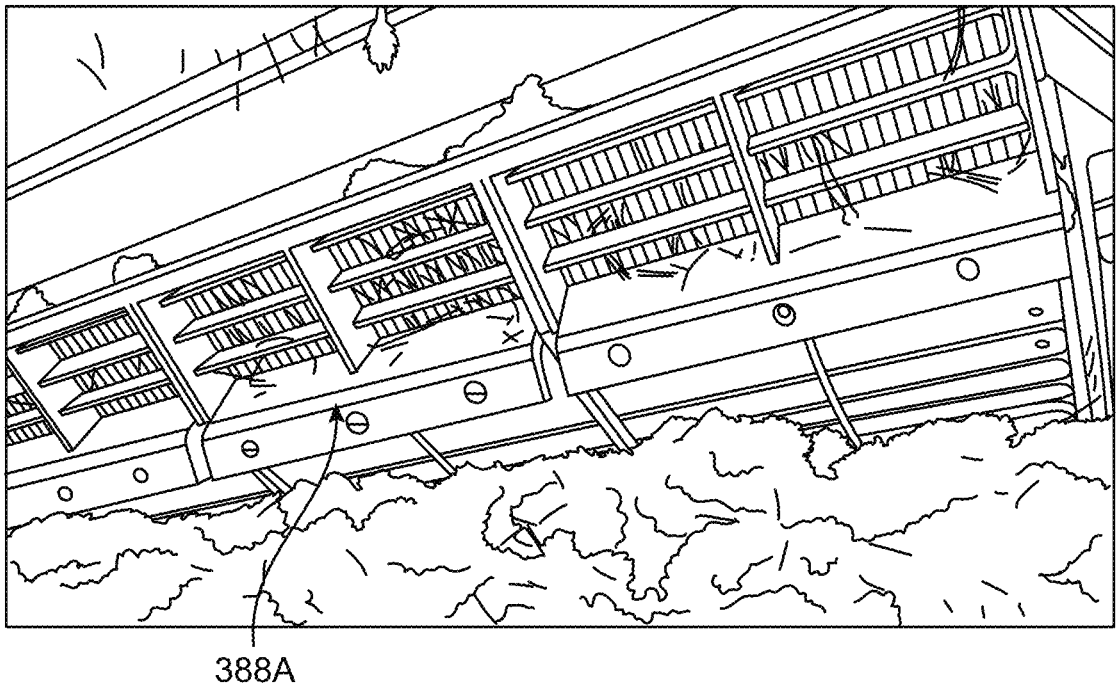
Figure 10B:
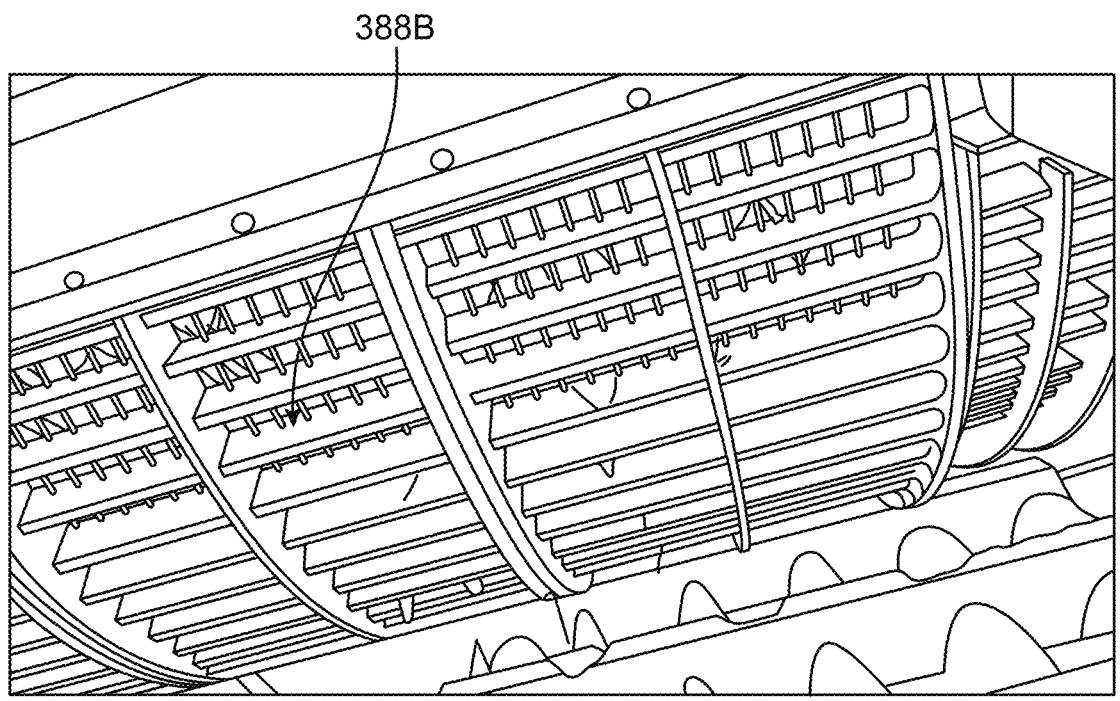

FIGS. 10A and 10B show concaves 388A, 388B that can be included in the combine 350. In some implementations, small wire concaves can be included. In some implementations, large wire concaves can be included.

To operate the combine 350, any suitable initial crop settings can be used. For example, the settings for corn can be initially selected and adjusted as needed. For example, the settings shown in Table 1 below can be used as the initial settings for the combine 350.

TABLE 1

Operation
Specialty Rotor, AFX Rotor - Initial Crop Settings
1688/2188, 2377/2388 and Upgrades of Other Models

| Crop | Rotor | | | | Chaffer Setting (Inch) | | | Shoe | Transport | | |
| | Speed | Gear Range | Concave Indicator | Type | Front | Middle | Rear | Setting (Inch) | Fan Speed | Grate Type | Vane Position |
|---|---|---|---|---|---|---|---|---|---|---|---|
| Corn | 400-500 | Middle | 3-5 | LW | ½ | ½ | ⅝ | ⅜ | 1100 | Bar | Rear |

Figure 10C:
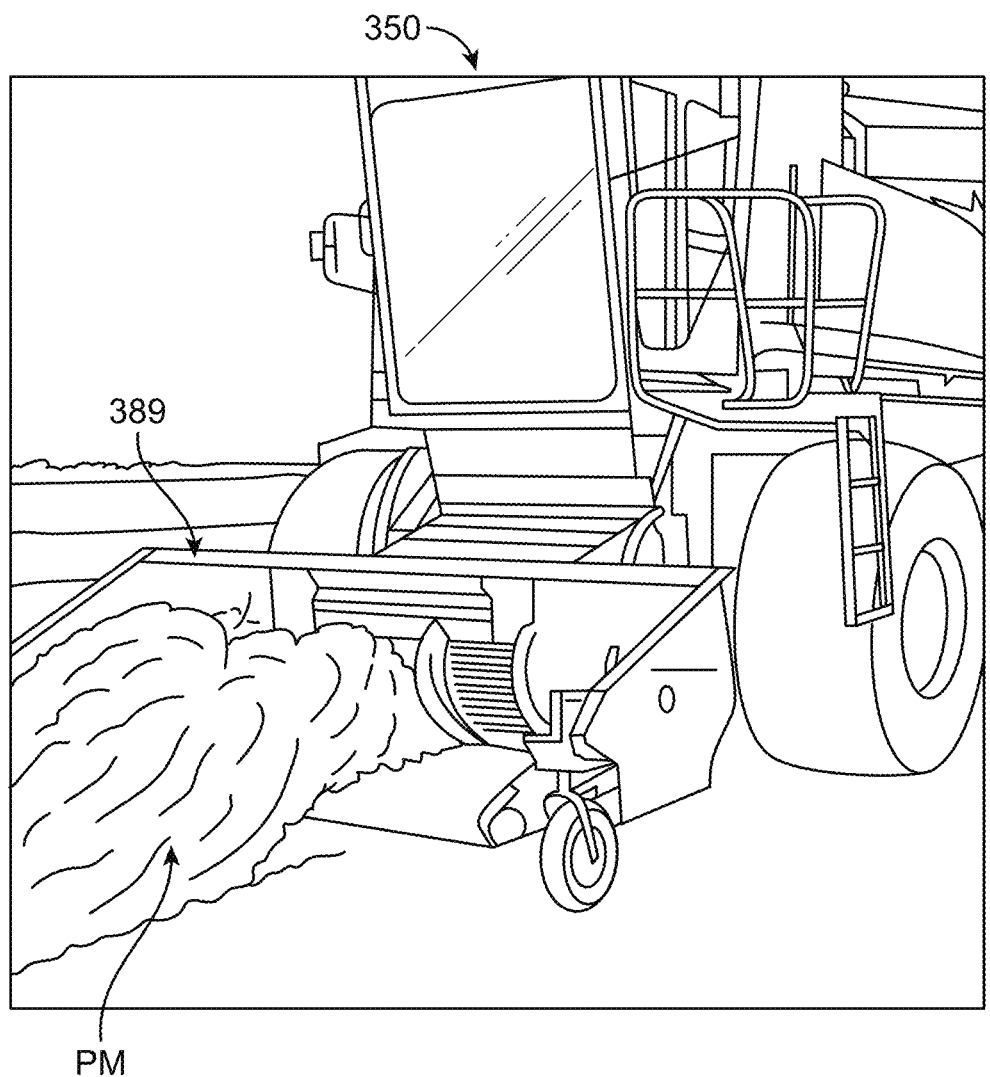
Figure 10D:
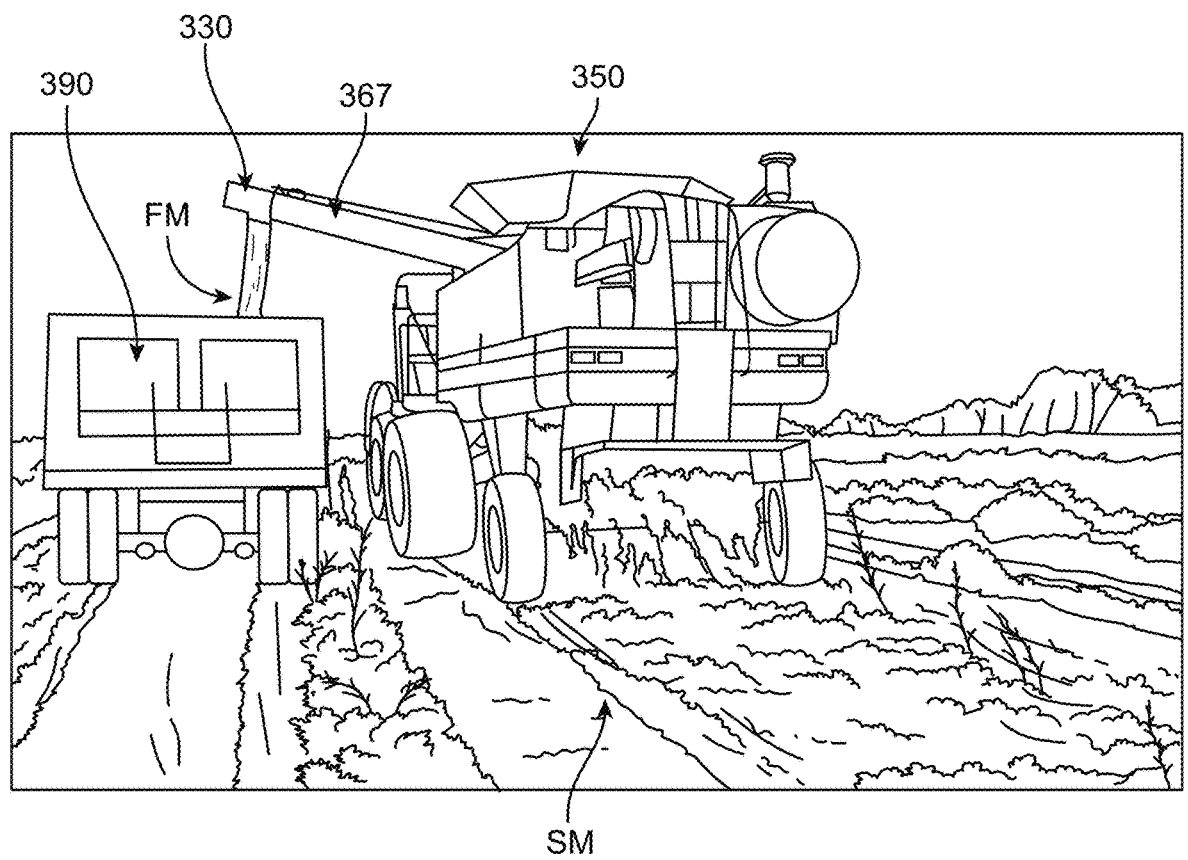

The system 300 can be used according to any suitable method, such as any of the methods of operation described herein. For example, FIG. 10C shows a header 389 of the combine 350 picking up rowed plant material PM and rolling the plant material PM into an interior of the combine 350. FIG. 10D shows a back view of the combine 350 during operation. As shown, the combine can pick up plant material PM, separate the stalk material SM from the flower material FM, deposit the stalk material SM out of the back of the combine 350, and convey the flower material FM through the first auger tube 367 and the auger tip 330, through a chute 391, and into a truck 390. The truck 390 can be, for example, a chain floor truck. The truck 390 can drive alongside the combine 350 during operation such that flower material FM is continuously delivered to the truck bed 390 while the combine 350 is intaking and processing plant material PM.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A system, comprising:
an open sieve including an outer frame and a set of crossbars, the outer frame and the set of crossbars collectively defining a plurality of openings, the open sieve configured to be disposed within a combine harvester in place of a previously-installed sieve of the combine harvester, below a chaffer of the combine harvester, and above a pan of the combine harvester such that flower material falls freely from the chaffer, through the plurality of openings, and to the pan for transport by at least one of an auger or a grain elevator to a grain bin of the combine harvester; and
an auger tip including a tubular portion and a flange, the tubular portion having a first end, a second end, and defining an interior cavity, the flange of the auger tip being coupled to the first end and extending outwardly from the tubular portion relative to a central axis of the tubular portion, the flange of the auger tip configured to be selectively coupled to a flange of an auger housing portion of the combine harvester such that an auger within the auger housing portion transports the flower material from the grain bin to the interior cavity of the tubular portion, the tubular portion defining an opening in a sidewall of the tubular portion such that the flower material within the interior cavity falls through the opening in the sidewall.

2. The system of claim 1, wherein the set of crossbars includes a first crossbar and a second crossbar, an opening of the plurality of openings defined between the first crossbar and the second crossbar being unobstructed between a first plane including an upper surface of each of the first crossbar and the second crossbar to a second plane including a lower surface of each of the first crossbar and the second crossbar.

3. The system of claim 2, wherein a vertical path of the flower material from the chaffer, through the plurality of openings, and to the pan is unobstructed between the chaffer and the pan.

4. The system of claim 1, wherein the outer frame includes a first elongated member, a second elongated member, a third elongated member, a fourth elongated member, a first flange, and a second flange, a first end of the first elongated member coupled to a second end of the second elongated member, a first end of the second elongated member coupled to a second end of the third elongated member, a first end of the third elongated member coupled to a second end of the fourth elongated member, a first end of the fourth elongated member coupled to a second end of the first elongated member, the first flange coupled to the second elongated member and disposed at a first angle relative to an upper surface of the second elongated member, the second flange coupled to the fourth elongated member and disposed at a second angle relative to an upper surface of the fourth elongated member, first angle and the second angle being between greater than 90 degrees, the first flange extending laterally beyond an outer periphery of the second elongated member and the second flange extending laterally beyond an outer periphery of the fourth elongated member.

5. The system of claim 1, further comprising a shaft assembly at least partially disposed within the interior cavity of the auger tip, the shaft assembly including a shaft and a bearing, the bearing disposed within an opening in the second end of the tubular portion and coupled to a second end of the shaft such that the shaft rotates relative to the tubular portion, the shaft having a first end configured to selectively engage with a corresponding mating feature of the auger when the flange of the auger tip is selectively coupled to the flange of the auger housing portion such that the shaft rotates under control of the auger.

6. The system of claim 5, wherein the bearing is a first bearing, the auger tip including an inner wall disposed between the first end and the second end of the tubular portion, the inner wall defining an opening, a second bearing of the shaft assembly disposed within the opening, the shaft configured to be engaged with the second bearing such that the shaft rotates relative to the inner wall, the inner wall and the second end of the tubular portion collectively supporting at least a portion of a weight of the shaft and a portion of a weight of the auger.

7. The system of claim 5, wherein the shaft assembly includes an extension member coupled to the shaft and extending away from an outer surface of the shaft, the extension member configured to rotate about the shaft within a plane including the opening in the sidewall of the tubular portion such that the extension member urges the flower material toward the opening.

8. The system of claim 1, further comprising the combine harvester, the combine harvester defining a rear internal cavity, the rear internal cavity defining a sieve channel in a back wall of the rear internal cavity, the combine harvester including a first side rail and a second side rail coupled to a first sidewall and a second sidewall, respectively, of the rear internal cavity, the sieve channel, the first side rail, and the second side rail configured to be selectively and alternatively coupled to each of a sorting sieve and the open sieve, the sorting sieve including sieve elements configured to obstruct a vertical path of the flower material from the chaffer to the pan when the sorting sieve is received within the rear internal cavity such that a first portion of the sorting sieve is disposed within the sieve channel, a second portion of the sorting sieve is disposed on the first side rail, and a third portion of the sorting sieve is disposed on the second side rail, the open sieve configured to allow the flower material to fall along a vertical path from the chaffer, through the plurality of openings, and to the pan without obstruction when the open sieve is received within the rear internal cavity such that a first portion of the outer frame is disposed within the sieve channel, a second portion of the outer frame is disposed on the first side rail, and a third portion of the outer frame is disposed on the second side rail.

9. The system of claim 1, further comprising a bin agitator including an elongated member, a first bar segment, and a second bar segment, the first bar segment and the second bar segment disposed closer to a first end of the elongated member than a second end of the elongated member, the bin agitator configured to be disposed in the grain bin of the combine harvester and rotated via a motor to urge the flower material toward the auger.

10. The system of claim 9, further comprising a first mounting bracket and a second mounting bracket, the first mounting bracket configured to couple a first end of the elongated member to a first wall of the grain bin, the second mounting bracket configured to couple a second end of the elongated member to a second wall of the grain bin.

11. The system of claim 1, further comprising the combine harvester, wherein, when the open sieve is disposed within the combine harvester and the flange of the auger tip is coupled to the flange of the auger housing portion of the combine harvester, the combine harvester is configured to simultaneously, such that the flower material disposed in the grain bin does not increase above a threshold level:
receive plant material into a concave portion of the combine harvester;
thresh the plant material with a threshing drum of the combine harvester in the concave portion such that the plant material is separated into the flower material and stalk material;
sort the stalk material and the flower material such that the stalk material is deposited out of a back of the combine harvester and the flower material passes through the open sieve and is conveyed to the grain bin of the combine harvester; and
carry the flower material out of the grain bin and through the opening in the sidewall of the tubular portion of the auger tip via the auger housing portion and the auger tip such that the flower material passes to an external container.

12. The system of claim 1, further comprising a bin agitator including an elongated member, and a plurality of bar segments, each bar segment of the plurality of bar segments coupled to closer to a first end of the elongated member than a second end of the elongated member such that a portion of the elongated member between a center and the second end is free of contact with bar segments, the bin agitator configured to be disposed in the grain bin of the combine harvester and rotated via a motor to urge the flower material toward the auger.

13. The system of claim 12, wherein each bar segment of the plurality of bar segments is coupled to the elongated member such that a central portion of each bar segment is in contact with the elongated member and each bar segment is disposed perpendicularly to an adjacent bar segment of the plurality of bar segments.

14. The system of claim 1, further comprising an air obstruction component configured to be coupled to the combine harvester to prevent air from blowing on the flower material.

15. The system of claim 1, wherein the flower material includes cannabis flowers.

16. A method, comprising:
- installing an open sieve in place of a previously-installed sieve of a combine harvester, the open sieve defining a first opening and a second opening;
- removing a fan belt from the combine harvester such that a fan of the combine harvester is disabled;
- uncoupling a previously-installed first auger tube portion of the combine harvester from a previously-installed second auger tube portion of the combine harvester;
- coupling an auger tip to the first auger tube portion;
- installing a bin agitator within a grain bin of the combine harvester;
- coupling the bin agitator to a motor configured to control rotation of the bin agitator; and
- coupling the motor to a hydraulic interface of the combine harvester via hydraulic hoses such that the hydraulic interface of the combine harvester controls actuation and direction of rotation of the bin agitator.

17. The method of claim 16, wherein the open sieve includes an outer frame and a set of crossbars, the outer frame and the set of crossbars collectively defining a plurality of openings, an opening of the plurality of openings defined between two adjacent crossbars of the set of crossbars being unobstructed between a first plane including an upper surface of each of the adjacent crossbars to a second plane including a lower surface of each of the adjacent crossbars.

18. The method of claim 16, wherein the auger tip includes a tubular portion and a flange, the tubular portion having a first end, a second end, and defining an interior cavity, the flange being coupled to the first end, the flange configured to be coupled to an auger housing portion of the combine harvester such that an auger within the auger housing portion transports a flower material to the interior cavity of the tubular portion, the tubular portion defining an opening in a sidewall of the tubular portion such that the flower material within the interior cavity falls through the opening in the sidewall.

19. The method of claim 16, further comprising coupling a first end of a shaft of a shaft assembly at least partially disposed within an interior cavity of the auger tip to a corresponding mating feature of an auger disposed within the first auger tube portion, the shaft assembly including a bearing disposed within an opening in a second end of a tubular portion of the auger tip and coupled to a second end of the shaft such that the shaft rotates relative to the tubular portion.

* * * * *